US012272897B2

(12) United States Patent
Shioda et al.

(10) Patent No.: US 12,272,897 B2
(45) Date of Patent: Apr. 8, 2025

(54) CONNECTOR WITH FIRST AND SECOND SIDE RETAINING PORTIONS

(71) Applicant: IRISO ELECTRONICS CO., LTD., Yokohama (JP)

(72) Inventors: Hideki Shioda, Yokohama (JP); Hiroaki Yukutake, Yokohama (JP); Yoshihito Ohkuma, Yokohama (JP); Hitoshi Suzuki, Yokohama (JP)

(73) Assignee: IRISO ELECTRONICS CO., LTD., Yokohama (JP)

( * ) Notice: Subject to any disclaimer, the term of this patent is extended or adjusted under 35 U.S.C. 154(b) by 343 days.

(21) Appl. No.: 17/630,748

(22) PCT Filed: Jul. 29, 2020

(86) PCT No.: PCT/JP2020/029106
§ 371 (c)(1),
(2) Date: Jan. 27, 2022

(87) PCT Pub. No.: WO2021/020459
PCT Pub. Date: Feb. 4, 2021

(65) Prior Publication Data

US 2022/0271470 A1 Aug. 25, 2022

(30) Foreign Application Priority Data

Jul. 29, 2019 (JP) ................................ 2019-139203

(51) Int. Cl.
*H01R 13/506* (2006.01)
*H01R 13/6477* (2011.01)

(52) U.S. Cl.
CPC ....... *H01R 13/506* (2013.01); *H01R 13/6477* (2013.01)

(58) Field of Classification Search
None
See application file for complete search history.

(56) References Cited

U.S. PATENT DOCUMENTS 5,201,663 A 4/1993 Kikuchi et al.
5,269,692 A 12/1993 Takahashi
(Continued)

FOREIGN PATENT DOCUMENTS

JP H04-370677 A 12/1992
JP H05-135821 A 6/1993
(Continued)

OTHER PUBLICATIONS

International Search Report (including English translation) and Written Opinion for International Application No. PCT/JP2020/029106, dated Oct. 6, 2020, 9 pages.
(Continued)

*Primary Examiner* — Oscar C Jimenez
(74) *Attorney, Agent, or Firm* — Westman, Champlin & Koehler, P.A.

(57) ABSTRACT

For a connector including a terminal and a housing into which the terminal is inserted, the degrees of freedom of design are raised for a retaining portion that retains the terminal, and adjustment of connector characteristics such as impedance is facilitated.
A connector is configured including terminals (signal terminals and power source terminals) and housings into which the terminals are inserted. The housings are configured including a first housing (the fitting housing) and a second housing (the mounted housing). The first housing includes first side retaining portions (signal terminal retaining portions and power source terminal retaining portions of the fitting housing) that retain portions of the terminals. The second housing includes second side retaining portions (signal terminal retaining portions and power source terminal retaining portions of the mounted housing) that retain other portions of the terminals.

3 Claims, 24 Drawing Sheets

(56) References Cited

U.S. PATENT DOCUMENTS

| | | | | |
|---|---|---|---|---|
| 6,457,980 | B2 | 10/2002 | Hattori et al. | |
| 6,743,053 | B2 * | 6/2004 | Wu | H01R 13/506 439/357 |
| 7,887,350 | B2 * | 2/2011 | Fukazawa | H01R 12/707 439/247 |
| 9,711,880 | B2 * | 7/2017 | Kiryu | H01R 13/6315 |
| 10,950,978 | B2 * | 3/2021 | Shioda | H01R 13/502 |
| 11,349,240 | B2 * | 5/2022 | Yoshida | H01R 12/91 |
| 2002/0061671 | A1 * | 5/2002 | Torii | H01R 13/6315 439/247 |
| 2010/0203772 | A1 * | 8/2010 | Mao | H01R 13/514 439/701 |
| 2012/0003875 | A1 * | 1/2012 | Akai | H01R 13/6315 439/660 |
| 2015/0044901 | A1 | 2/2015 | Doi et al. | |
| 2016/0126658 | A1 | 5/2016 | Yamakami et al. | |

FOREIGN PATENT DOCUMENTS

| | | | |
|---|---|---|---|
| JP | H11-288759 | A | 10/1999 |
| JP | 2001-326037 | A | 11/2001 |
| JP | 2002-158070 | A | 5/2002 |
| JP | 2017-135122 | A | 8/2017 |

OTHER PUBLICATIONS

Extended European Search Report, for European Patent Application No. 20846992.4, dated Jul. 7, 2023, 11 pages.

* cited by examiner

CONNECTOR WITH FIRST AND SECOND SIDE RETAINING PORTIONS

CROSS-REFERENCE TO RELATED APPLICATION

This Application is a Section 371 National Stage Application of International Application No. PCT/JP2020/029106, filed 29 Jul. 2020, and published as WO 2021/020459 A1, on 4 Feb. 2021, in Japanese, the contents of which are hereby incorporated by reference in their entireties.

TECHNICAL FIELD

The present disclosure relates to a connector.

BACKGROUND ART

Hitherto connectors such as that described in Patent Document 1 are known. This connector (plug connector 2) includes a terminal and a housing. The terminal is retained in the housing by being inserted into the housing.

PRIOR ART LITERATURE

Patent Documents

Patent Document 1: Japanese Patent Application Laid-Open (JP-A) No. 2017-135122

SUMMARY OF INVENTION

Technical Problem

There is a desire with the connector of Patent Document 1 to raise the degrees of freedom of design for the retaining portion that retains the terminal.

Namely, in this connector a single housing (plug housing 6) retains the terminal. Therefore, depending on the conditions for housing molding, the retaining portion is divided into a one end side retaining portion (mounting groove 6*a*3, mounting hole 6*b*1), and an other end side retaining portion (mounting groove 6*c*2). The length of the retaining portion is thereby suppressed from becoming longer, and forming the retaining portion when molding the housing is easier. More specifically, by suppressing the retaining portion from becoming longer, a part of the mold used for forming the retaining portion when molding the housing does not need to be formed longer. The part is accordingly less liable to break.

However, with this connector, although the retaining portion is easy to form, a large space is formed at a width direction (inter-row direction) center of a housing lower portion. This space is a portion where the mold part is positioned when molding the housing. The portion where the one end side retaining portion of the terminal is retained is exposed at this space. Thus the impedance of this exposed portion of the terminal tends to rise more than other portions of the terminal.

An object of the present disclosure is, for a connector including a terminal and a housing into which the terminal inserted, to raise the degrees of freedom of design for a retaining portion to retain the terminal, and to facilitate adjustment of connector characteristics, such as impedance and the like.

Solution to Problem

A connector according to a first aspect is a connector including a terminal and a housing into which the terminal is inserted. The housing is configured including a first housing and a second housing. The first housing includes a first side retaining portion that retains a portion of the terminal. The second housing includes a second side retaining portion that retains another portion of the terminal.

Note that in the present specification "retaining" a portion of the terminal by the housing means restricting movement of the portion of the terminal in two or more directions by abutting or being in close proximity to the portion of the terminal from the two or more directions including two mutually opposing directions.

In this aspect the connector includes the terminal and the housing into which the terminal is inserted. The housing is configured including the first housing and the second housing. The first housing includes the first side retaining portion that retains the portion of the terminal, and the second housing includes the second side retaining portion that retains the other portion of the terminal.

Namely, the retaining portions that retain the terminals are formed so as to be divided between the first housing and the second housing. The moldability of housing molding using a mold is accordingly increased and the degrees of freedom of design are raised for the retaining portions compared to a configuration in which all of the retaining portions for that retain the terminals are formed to a single housing. Raising the degrees of freedom of design for the retaining portions facilitates adjustment of connector characteristics, such as impedance and the like.

The connector according to a second aspect is the first aspect, wherein the first side retaining portion is configured including a first side surrounding portion that surrounds the terminal, and the second side retaining portion is configured including a second side surrounding portion that surrounds the terminal.

In this aspect, the first side retaining portion is configured including the first side surrounding portion that surrounds the terminal, and the second side retaining portion is configured including the second side surrounding portion that surrounds the terminal. Namely, the first side retaining portion and the second side retaining portion are both configured including a surrounding portion that surrounds the terminal.

This accordingly enables the impedance of a portion of the terminal retained by the second housing to be suppressed from rising compared, for example, to a configuration in which the first side retaining portion is configured including a surrounding portion but the second side retaining portion is configured not including a surrounding portion.

A connector of a third aspect is the first aspect, wherein the first side retaining portion and the second side retaining portion are positioned on a straight line.

In this aspect the first side retaining portion and the second side retaining portion are positioned on a straight line.

There is accordingly no need to form a bent portion between the portion of the terminal retained by the first side retaining portion and the portion thereof retained by the second side retaining portion.

A connector according to a fourth aspect is the second aspect, wherein the first side surrounding portion and the second side surrounding portion are positioned on a straight line.

In this aspect, the first side surrounding portion and the second side surrounding portion are positioned on a straight line.

Thus when manufacturing the connector, the first side surrounding portion and the second side surrounding portion are positioned on a straight line when the first housing and the second housing are positionally aligned. This accordingly enables the terminal to be inserted along the straight line.

The connector according to the fifth aspect is the fourth aspect, wherein a distance between the first side surrounding portion and the second side surrounding portion is shorter than a shorter of the first side surrounding portion or the second side surrounding portion.

In this aspect the distance between the first side surrounding portion and the second side surrounding portion is short (specifically shorter than the shorter out of the first side surrounding portion and the second side surrounding portion).

This means that the length of the portion of the terminal positioned between the first side surrounding portion and the second side surrounding portion, namely the portion not surrounded by housing, is short. As a result thereof, the segment susceptible to a rise in impedance can be made shorter in comparison to configurations in which this length is long.

The connector according to a sixth aspect is any one out of the first aspect to the fifth aspect, wherein the first housing is a fitting housing configured to fit together with a connection target, the second housing is a mounted housing to be disposed between the first housing and a substrate, and the terminal is inserted into the housing using an uncoupling direction as an insertion direction.

In this aspect the first housing is the fitting housing configured to fit together with the connection target, and the second housing is the mounted housing disposed between the first housing and the substrate. The terminal is inserted into the housing using the uncoupling direction as the insertion direction.

This aspect is accordingly suitable for a connector long in the fitting direction.

A connector according to a seventh aspect is any one out of the first aspect to the sixth aspect, wherein plural of the terminals are provided, with the plural terminals including plural one side terminals arrayed along a pitch direction at an inter-row direction one side and plural other side terminals arrayed along the pitch direction at an inter-row direction other side, the first housing includes a projecting wall projecting out in an uncoupling direction and extending along the pitch direction, plural grooves that retain the plural one side terminals are formed in a wall face at the inter-row direction one side of the projecting wall, and plural grooves that retain the plural other side terminals are formed in a wall face at the inter-row direction other side of the projecting wall.

In this aspect there are plural of the terminals provided. The plural terminals include plural one side terminals arrayed in the pitch direction at the inter-row direction one side and plural other side terminals arrayed in the pitch direction at the inter-row direction other side. The first housing includes the projecting wall projecting out in the uncoupling direction and extending along the pitch direction. The plural grooves that retain the plural one side terminals are formed in the wall face at the inter-row direction one side of the projecting wall, and the plural grooves that retain the plural other side terminals are formed in the wall face at the inter-row direction other side of the projecting wall.

Thus this aspect is suitable for a multipolar plug connector.

A connector according to an eighth aspect is any one out of the first aspect to the seventh aspect, wherein the first housing is a fitting housing configured to fit together with a connection target, the terminal is inserted into the housing using an uncoupling direction from a second housing side of the first housing or the second housing as an insertion direction, the second side retaining portion is configured including a second side surrounding portion that surrounds the terminal, and a fitting direction side end of the second side surrounding portion is positioned over a range encompassing 20% of a fitting direction side of the connector.

Note that "a range encompassing 20% of the fitting direction side of the connector" means a range of 20% of the fitting side of the connector, with respect to the fitting direction dimension of the connector taken as 100%.

In this aspect, the first housing is the fitting housing configured to fit together with the connection target. The terminal is inserted into the housing using the uncoupling direction from the second housing side from out of the first housing or the second housing as the insertion direction.

The second side retaining portion is configured including the second side surrounding portion that surrounds the terminal, and the fitting direction side end of the second side surrounding portion is positioned over the range encompassing 20% of the fitting direction side of the connector.

This accordingly enables the portion on the fitting direction side of the terminal to be effectively surrounded by the second surrounding portion. Thus, for example, the impedance at the fitting direction side portion of the terminal can be suppressed from rising compared to the connector of Patent Document 1 in which the fitting direction side portion (lower portion) of the terminal is exposed.

The connector according to a ninth aspect is any one out of the first aspect to the eighth aspect, wherein the first housing is a fitting housing configured to fit together with a connection target, the terminal is inserted into the housing using an uncoupling direction from the second housing side from out of the first housing or the second housing as an insertion direction, and the second side retaining portion is configured merely from a second side surrounding portion that surrounds the terminal.

In this aspect, the first housing is the fitting housing configured to fit together with the connection target. The terminal is inserted into the housing using the uncoupling direction from the second housing side from out of the first housing or the second housing as the insertion direction.

The second side retaining portion is configured merely from the second side surrounding portion that surrounds the terminal.

This accordingly enables the fitting direction side portion of the terminal to be effectively surrounded by the second housing. Thus, for example, the impedance at the fitting direction side portion of the terminal can be suppressed from rising compared to the connector of Patent Document 1 in which the fitting direction side portion (lower portion) of the terminal is exposed.

This aspect is suitable for a connector long in the fitting direction. Moreover, in this aspect the surrounded portion of the terminal can be made long due to forming the second housing and the second side surrounding portion long in the fitting direction.

The connector according to the tenth aspect is any one out of the first aspect to the ninth aspect, wherein the terminal includes a first side press-fit portion for press-fitting into the first housing, and a second side press-fit portion for press-fitting into the second housing.

In this aspect the terminal includes the first side press-fit portion for press-fitting into the first housing and the second side press-fit portion for press-fitting into the second housing.

Separation of the first housing and the second housing is accordingly suppressed by the terminal.

The connector according to an eleventh aspect is any one out of the first aspect to the tenth aspect, wherein the terminal is inserted into the housing from the second housing side from out of the first housing or the second housing, plural of the terminals are provided, the plural terminals are configured including signal terminals and power source terminals, a number of the signal terminals is greater than a number of the power source terminals, the signal terminals each include a first side press-fit portion for press-fitting into the first housing and a second side press-fit portion for press-fitting into the second housing, and the power source terminals each include a second side press-fit portion for press-fitting into the second housing and do not include a first side press-fit portion for press-fitting into the first housing.

In this aspect, the signal terminals and the power source terminals are inserted into the housing from the second housing side from out of the first housing or the second housing. The signal terminals each include the first side press-fit portion for press-fitting into the first housing and the second side press-fit portion for press-fitting into the second housing. The power source terminals each include a second side press-fit portion for press-fitting into the second housing and do not include a first side press-fit portion for press-fitting into the first housing.

Separation of the first housing and the second housing is accordingly suppressed by the signal terminals. Moreover, each of the power source terminals does not include a first side press-fit portion for press-fitting into the first housing, facilitating insertion of the power source terminal into the housing in a state in which the first housing and the second housing have been positionally aligned.

Moreover, the number of the signal terminals is greater than the number of the power source terminals, and so suppression of separation of the first housing and the second housing is performed by the more numerous signal terminals.

Namely, in this aspect the terminals are more easily inserted into the housing than in a configuration in which both the signal terminals and the power source terminals include the first side press-fit portion, and suppression of separation of the first housing and the second housing is performed with more certainty than in a configuration in which it is only the less numerous power source terminals that include the first side press-fit portion.

A connector according to a twelfth aspect is any one out of the first aspect to the eleventh aspect, wherein the first housing and the second housing include a separation prevention mechanism configured including an engagement claw and an anchor portion, with the separation prevention mechanism preventing separation in an assembly direction of the first housing and the second housing by the engagement claw hooking onto the anchor portion.

In this aspect the first housing and the second housing include the separation prevention mechanism. The separation prevention mechanism is configured including the engagement claw and the anchor portion, and prevents separation in an assembly direction of the first housing and the second housing by the engagement claw hooking onto the anchor portion.

Thus separation in the assembly direction of the first housing and the second housing is prevented by the first housing and the second housing themselves.

Note that prevention of separation in the assembly direction of the first housing and the second housing may be performed by the separation prevention mechanism of this aspect in combination with another means. Namely, this aspect does not exclude a connector equipped with another means to prevent separation in the assembly direction of the first housing and the second housing.

The connector according to a thirteenth aspect is the twelfth aspect, wherein plural of the terminals are provided, the plural terminals include plural signal terminals and plural power source terminals, the plural power source terminals include a single or plural one side power source terminals arranged with respect to the plural signal terminals at a pitch direction one side of the signal terminals and a single or plural other side power source terminals arranged with respect to the plural signal terminals at a pitch direction other side, and the separation prevention mechanism includes a one side separation prevention mechanism formed between the plural signal terminals and the single or plural one side power source terminals, and an other side separation prevention mechanism formed between the plural signal terminals and the single or plural other side power source terminals.

In this aspect there are plural terminals provided. The plural terminals include plural signal terminals and plural power source terminals. The plural power source terminals include the single or plural one side power source terminals arranged with respect to the plural signal terminals at the pitch direction one side of the signal terminals, and the single or plural other side power source terminals arranged with respect to the plural signal terminals at the pitch direction other side.

The separation prevention mechanism includes the one side separation prevention mechanism formed between the plural signal terminals and the single or plural one side power source terminals, and the other side separation prevention mechanism formed between the plural signal terminals and the single or plural other side power source terminals.

This accordingly enables a connector to be made compact in a direction perpendicular to the signal terminal pitch direction.

The connector according to a fourteenth aspect is any one out of the first aspect to the thirteenth aspect, wherein the first housing and the second housing include a displacement restricting mechanism configured by a protrusion and an indentation, with the displacement restricting mechanism being configured to restrict mutual displacement in a direction orthogonal to an assembly direction of the first housing and the second housing by the protrusion being inserted into the indentation.

In this aspect the first housing and the second housing are equipped with the displacement restricting mechanism. The displacement restricting mechanism is configured including the protrusion and the indentation to restrict mutual displacement in the direction orthogonal to the assembly direction of the first housing and the second housing by the protrusion being inserted into the indentation.

Mutual displacement in a direction orthogonal to an assembly direction of the first housing and the second housing is accordingly prevented by the first housing and the second housing themselves.

Note that prevention of mutual displacement in the direction orthogonal to the assembly direction of the first housing and the second housing may be performed by the displacement restricting mechanism of this aspect, in combination with another means. In other words, this aspect does not exclude a connector equipped with another means to prevent mutual displacement in a direction orthogonal to the assembly direction of the first housing and the second housing.

A connector according to a fifteenth aspect is the fourteenth aspect, wherein plural of the terminals are provided, the plural terminals include plural one side terminals arrayed in a pitch direction at an inter-row direction one side and plural other side terminals arrayed in the pitch direction at an inter-row direction other side, the first housing includes a projecting wall projecting out in an uncoupling direction and extending along the pitch direction, plural grooves for retaining the plural one side terminals formed in a wall face on the inter-row direction one side of the projecting wall, and plural grooves for retaining the plural other side terminals formed in a wall face on the inter-row direction other side of the projecting wall, the protrusion of the displacement restricting mechanism is formed to the first housing and the indentation of the displacement restricting mechanism is formed to the second housing, plural of the indentations are provided, and the plural indentations are configured from a single or plural one side indentations formed at the inter-row direction one side with respect to the second side retaining portion, and a single or plural other side indentations formed at the inter-row direction other side with respect to the second side retaining portion.

In this aspect the plural grooves for retaining the plural terminals are formed in the wall face on the inter-row direction one side of the projecting wall. In such a connector a space is formed at the inter-row direction outside of the projecting wall, and a portion of a connection target such as a counterpart side connector is disposed in the space.

In this aspect the displacement restricting mechanism is formed by utilizing a portion further to the fitting direction side than this space. This accordingly enables a compact connector to be achieved while still being equipped with the displacement restricting mechanism.

Advantageous Effects

The present disclosure enables, for a connector equipped with a terminal and a housing into which the terminal is inserted, the degrees of freedom of design to be raised for a retaining portion for retaining the terminal, and facilitates adjustment of connector characteristics, such as impedance and the like.

DESCRIPTION OF EMBODIMENTS

Figure 1:
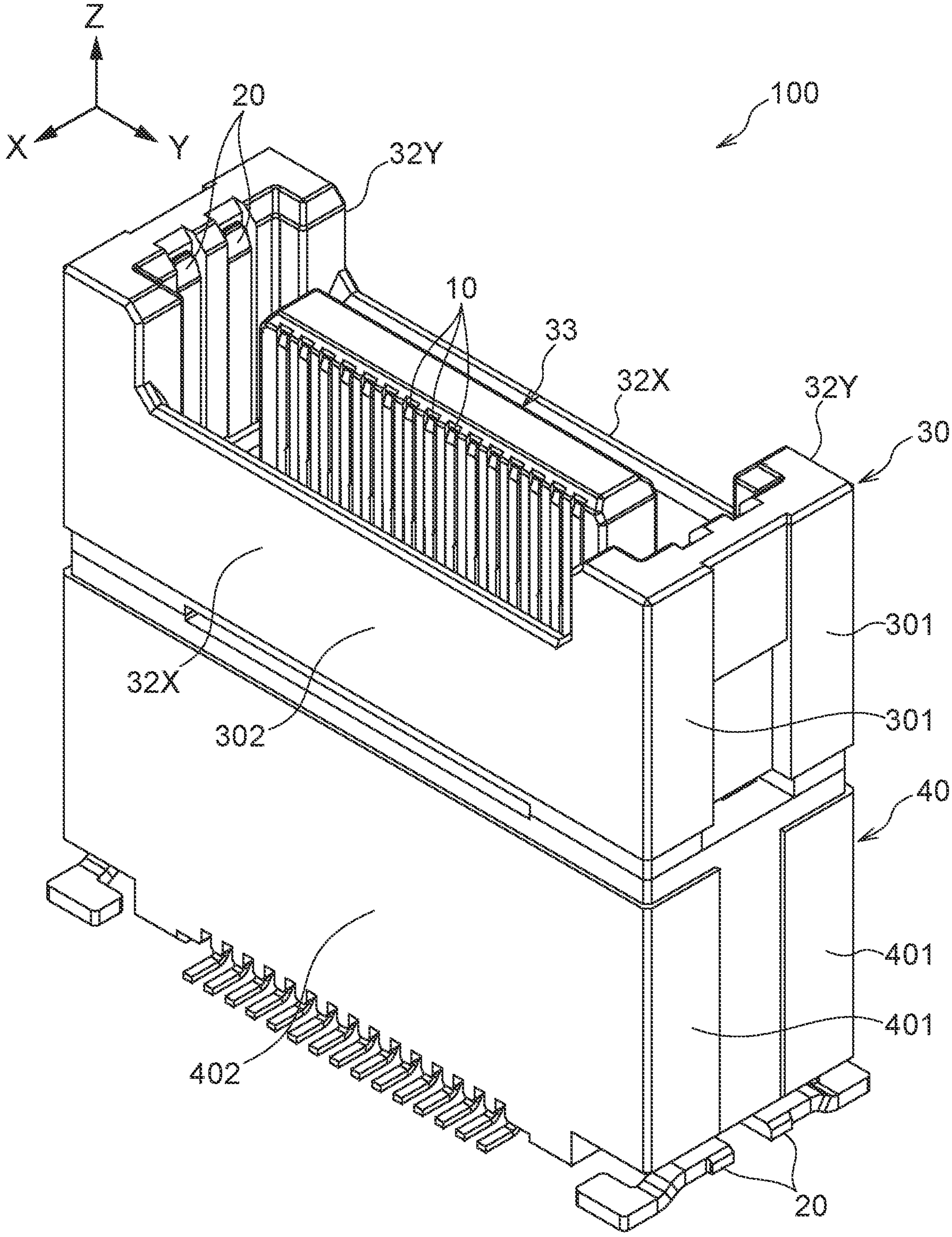
FIG. 1 is a perspective view of a connector of an exemplary embodiment.
Figure 2:
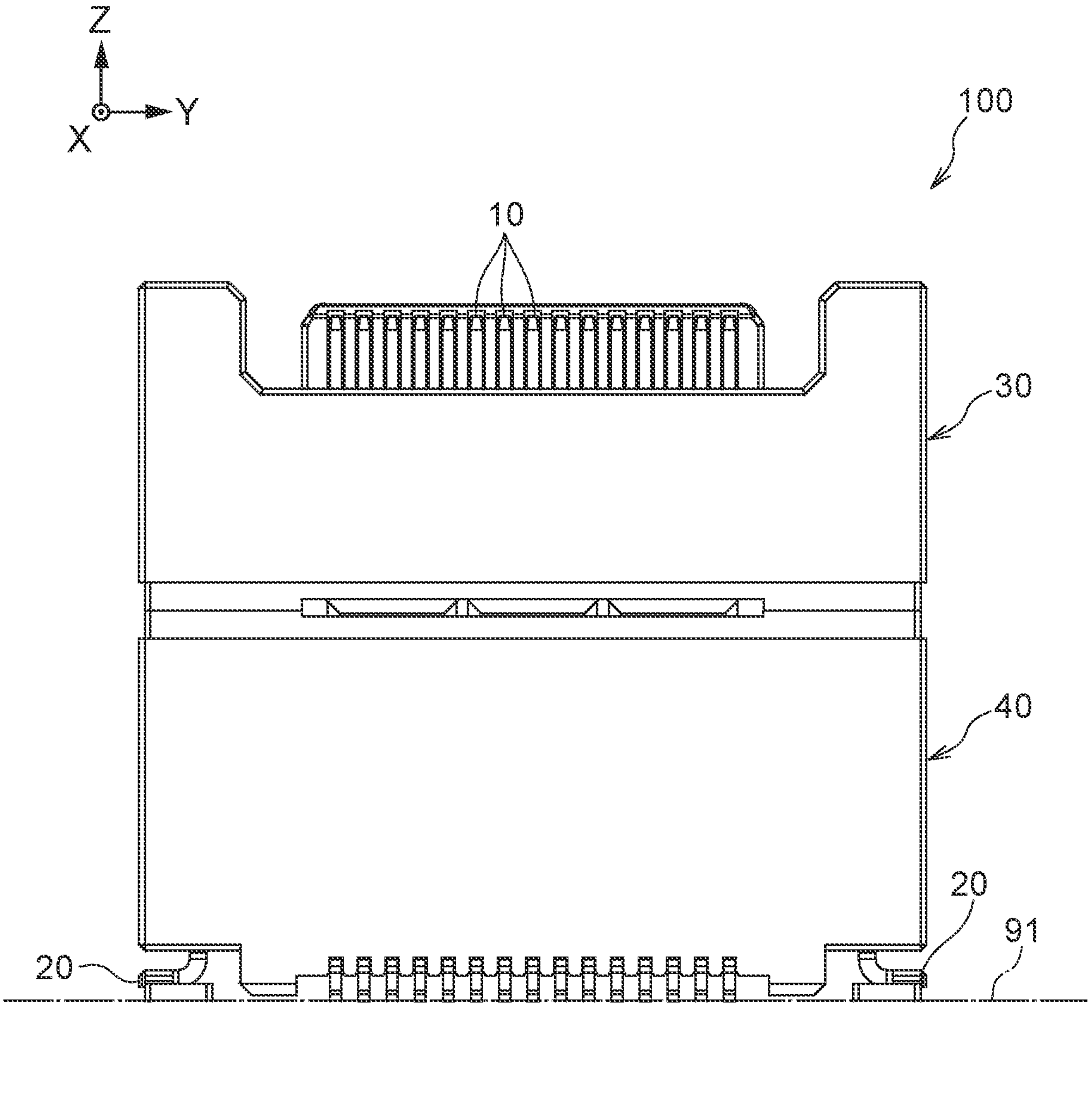
FIG. 2 is a face-on view of a connector of an exemplary embodiment.
Figure 3:
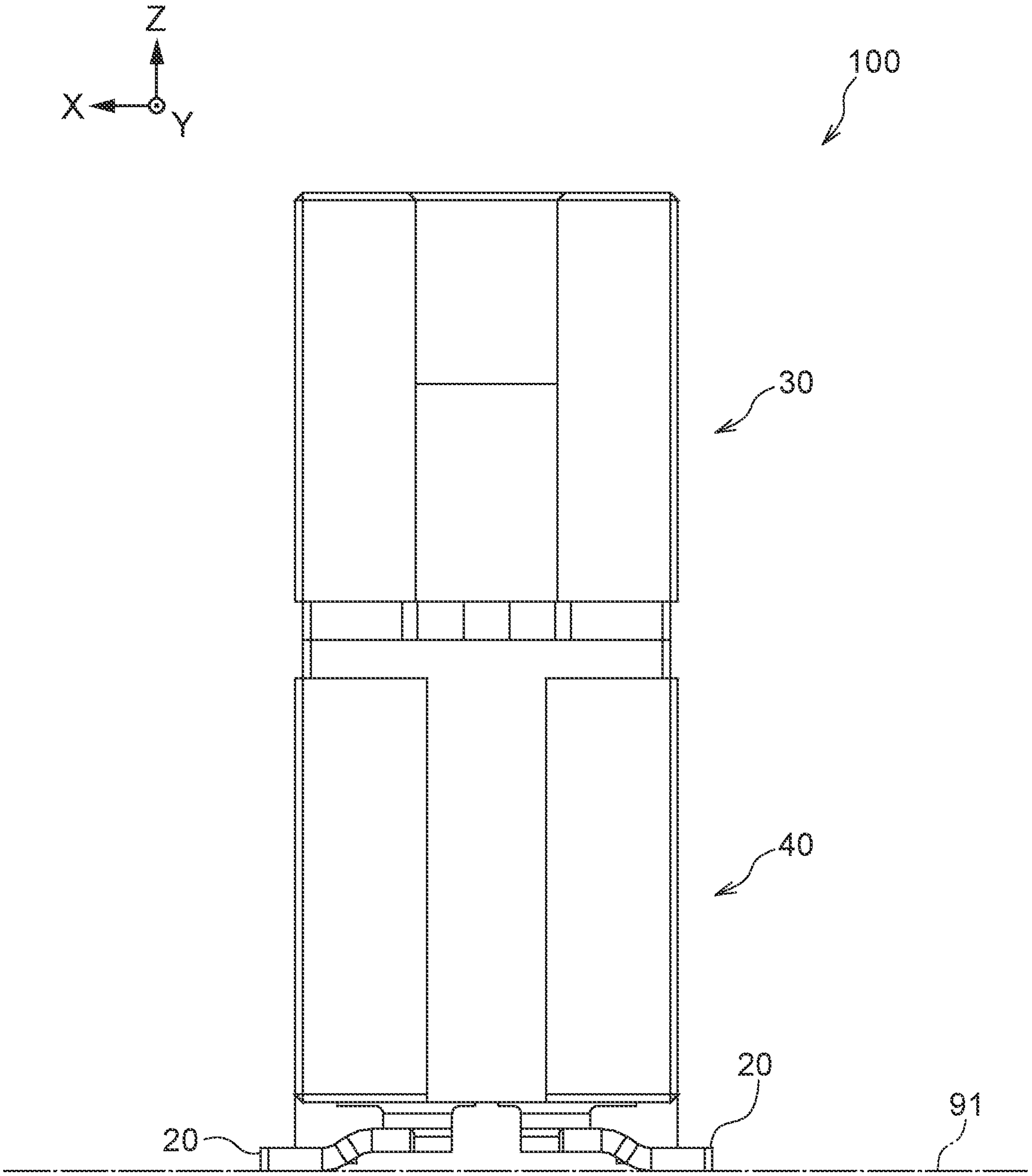
FIG. 3 is a side view of a connector of an exemplary embodiment.
Figure 4:
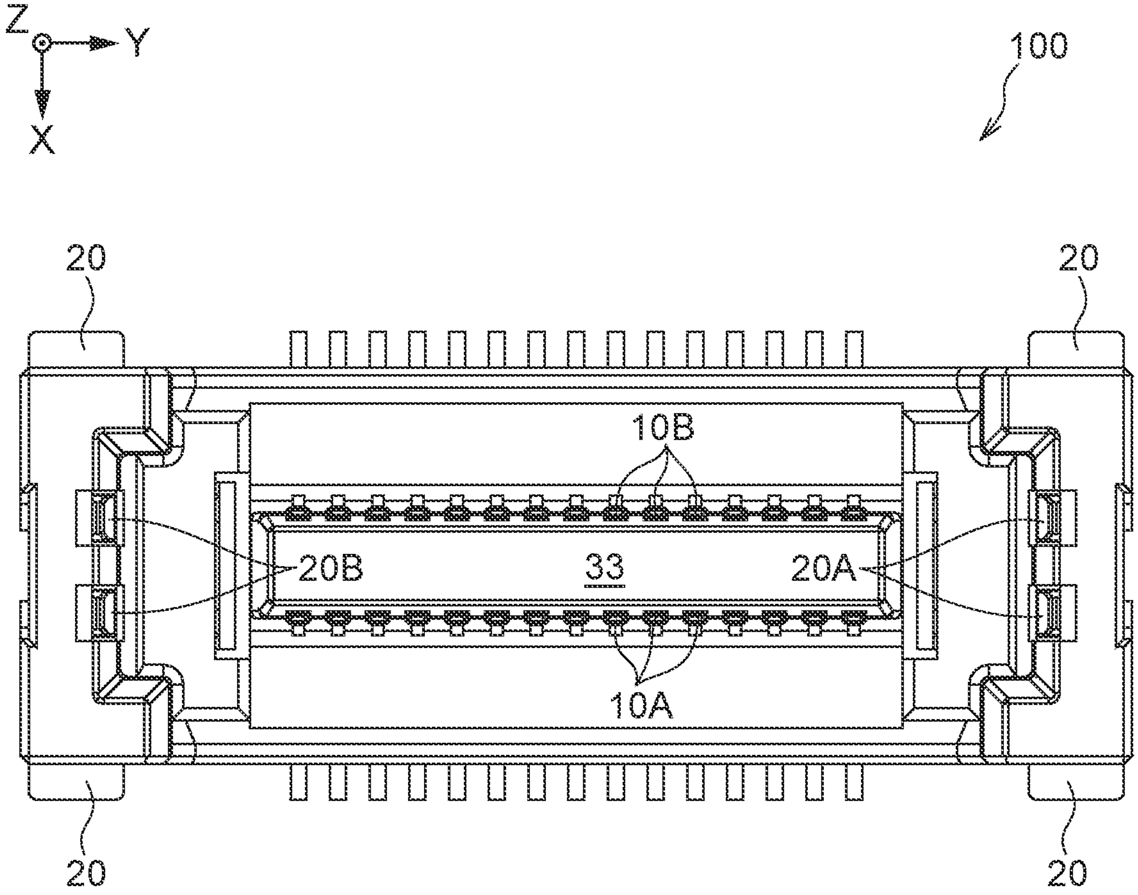
FIG. 4 is a plan view of a connector of an exemplary embodiment.
Figure 5:
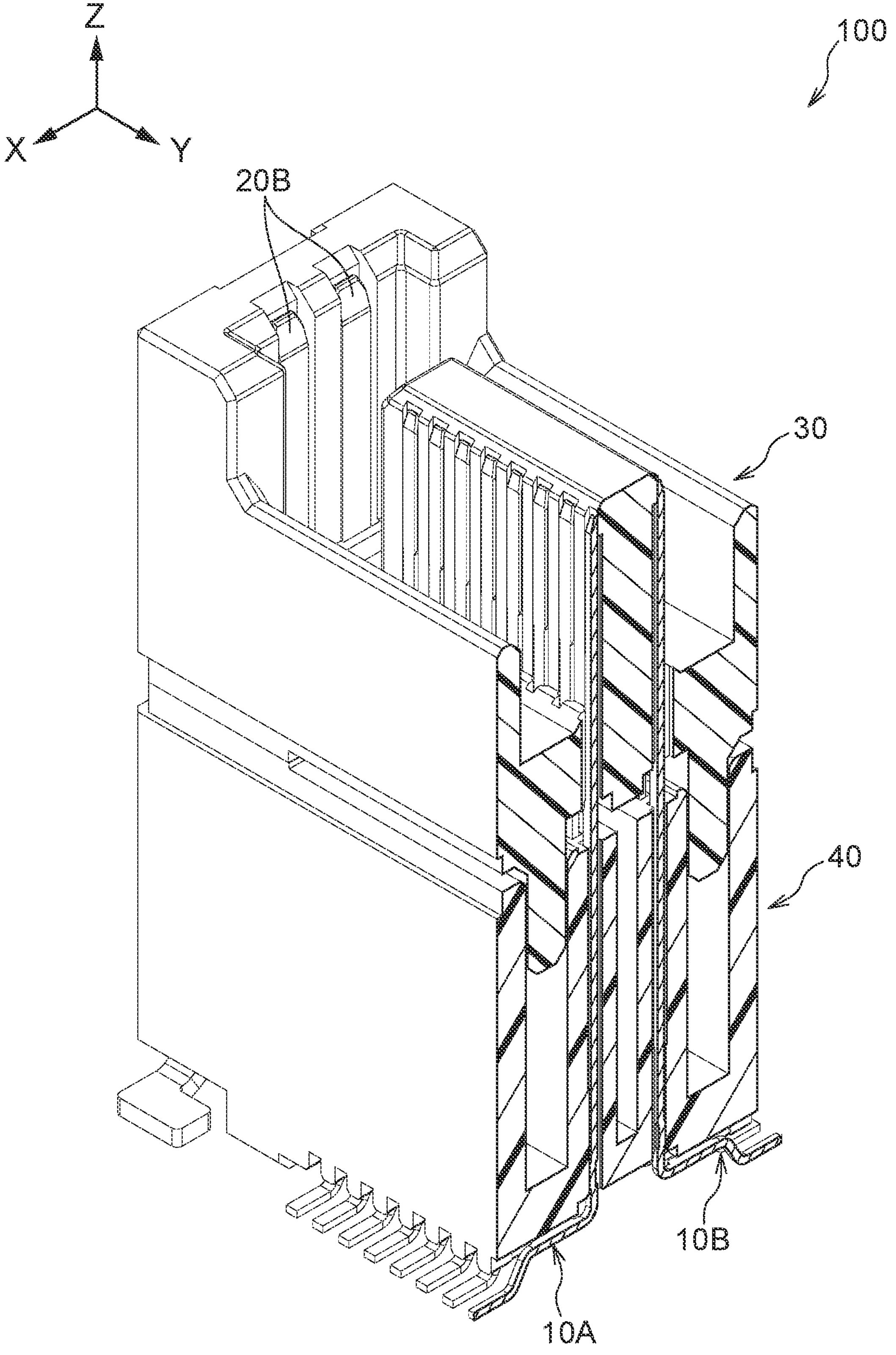
FIG. 5 is a cross-section perspective view illustrating a connector of an exemplary embodiment in a state sectioned along a plane orthogonal to a pitch direction (at a pitch direction central position).
Figure 6:
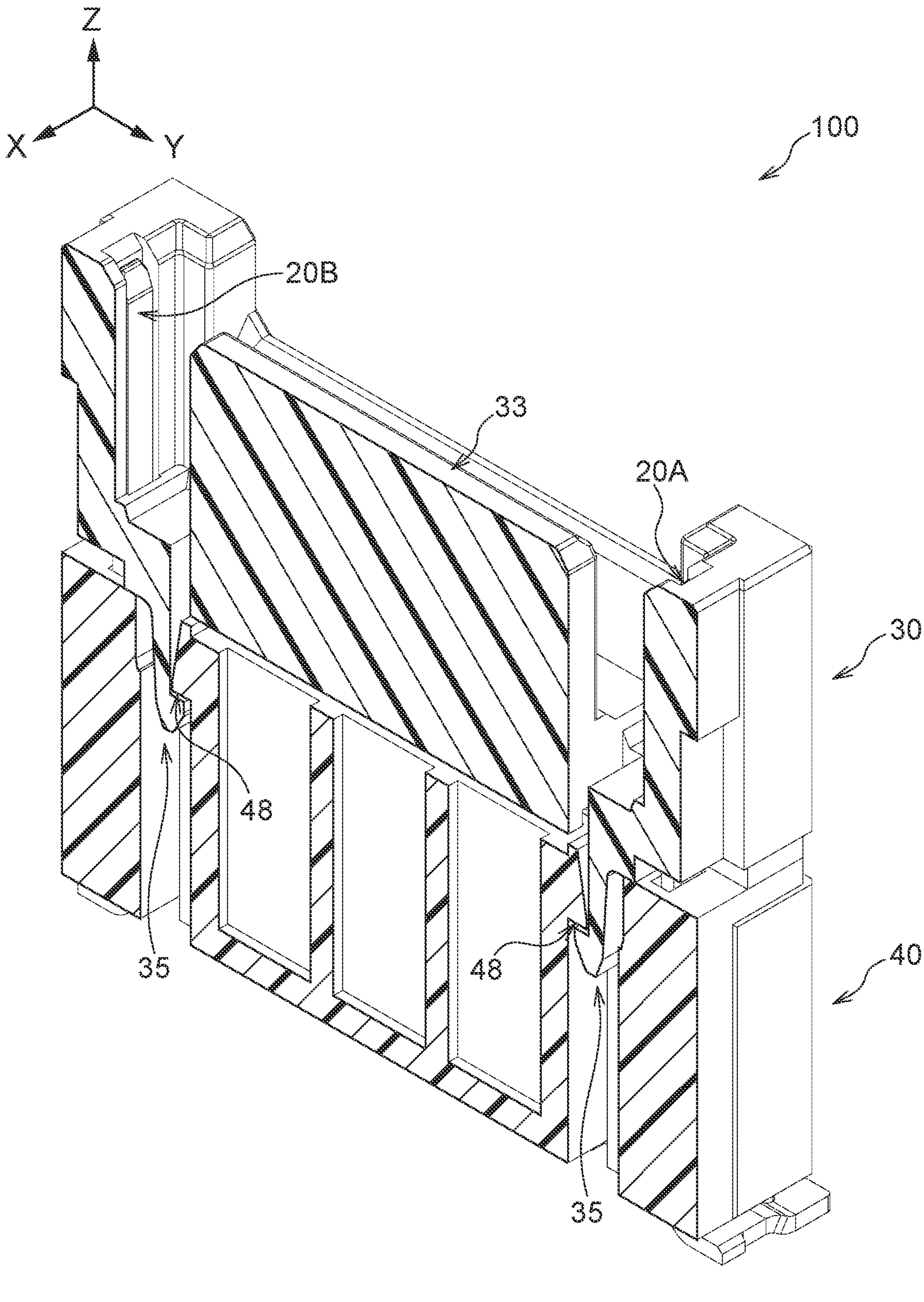
FIG. 6 is a cross-section perspective view illustrating a connector of an exemplary embodiment in a state sectioned along a plane orthogonal to an inter-row direction (at an inter-row direction central position).

Explanation follows regarding an exemplary embodiment of the present disclosure.

In each of the drawings, the arrow X indicates a connector front direction, the arrow Y indicates one side in a connector width direction, and an arrow Z indicates a connector upward direction. Note that the words used to indicate these directions are merely employed to ease definition thereof, and the orientation of the connector in the state of use is not limited thereby.

Moreover, a +X direction is one side in an inter-row direction (of a signal terminal 10), a +Y direction is a pitch direction one side, a −Z direction is a fitting direction, and a +Z direction is an uncoupling direction.

Moreover, the ±Z directions are also sometimes referred to as assembly directions (between a fitting housing 30 and a mounted housing 40).

A connector 100 according to the present exemplary embodiment is illustrated in FIG. 1 to FIG. 10.

The connector 100 is a connector for connecting substrates disposed parallel to each other together.

Specifically, the connector 100 is mounted to one substrate 91, and a counterpart side connector (non-illustrated) is mounted to another substrate (not illustrated in the drawings). The connector 100 and the counterpart side connector fit together and connect so as to electrically connect the one substrate 91 to the other substrate (not illustrated in the drawings). The connector 100 is configured so as to enable fitting and connecting of the counterpart side connector from above.

The connector 100 is not a so-called movable (floating) connector.

Specifically, although the connector 100 includes the fitting housing 30 and the mounted housing 40, the fitting housing 30 and the mounted housing 40 are not housings provided so as to cause mutual displacement of each other.

However, as described above, a connector 100 in which there is a slight amount of mutual displacement of the fitting housing 30 and the mounted housing 40 is not excluded from the scope of the present disclosure. In reality, in the connector 100 of the present exemplary embodiment there may be a slight amount of mutual displacement of the fitting housing 30 and the mounted housing 40.

Figure 10:
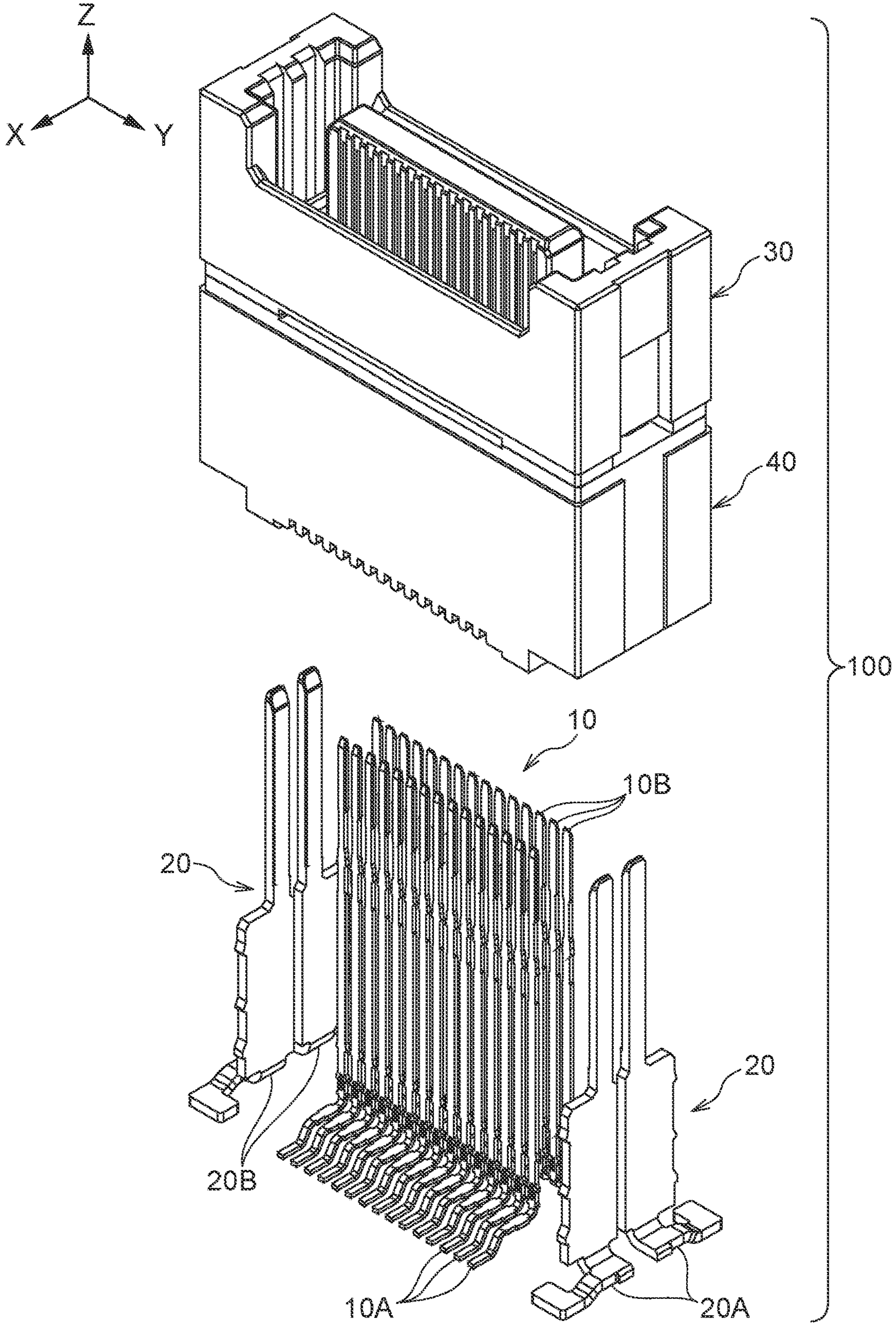
FIG. 10 is an exploded perspective view of a connector of an exemplary embodiment.

As illustrated in FIG. 10 and the like, the connector 100 is equipped with plural terminals 10, 20, and the housings 30, 40 for retaining the plural terminals 10, 20. The terminals 10, 20 are formed from a material through which electricity flows, such as a metal or the like. The housings 30, 40 are formed from an insulating material, such as a synthetic resin or the like.

The plural terminals 10, 20 are configured from plural signal terminals 10 and plural power source terminals 20.

The plural signal terminals 10 are configured from plural one side signal terminals 10A on the inter-row direction one side, and plural other side signal terminals 10B on the inter-row direction other side.

Figure 17:
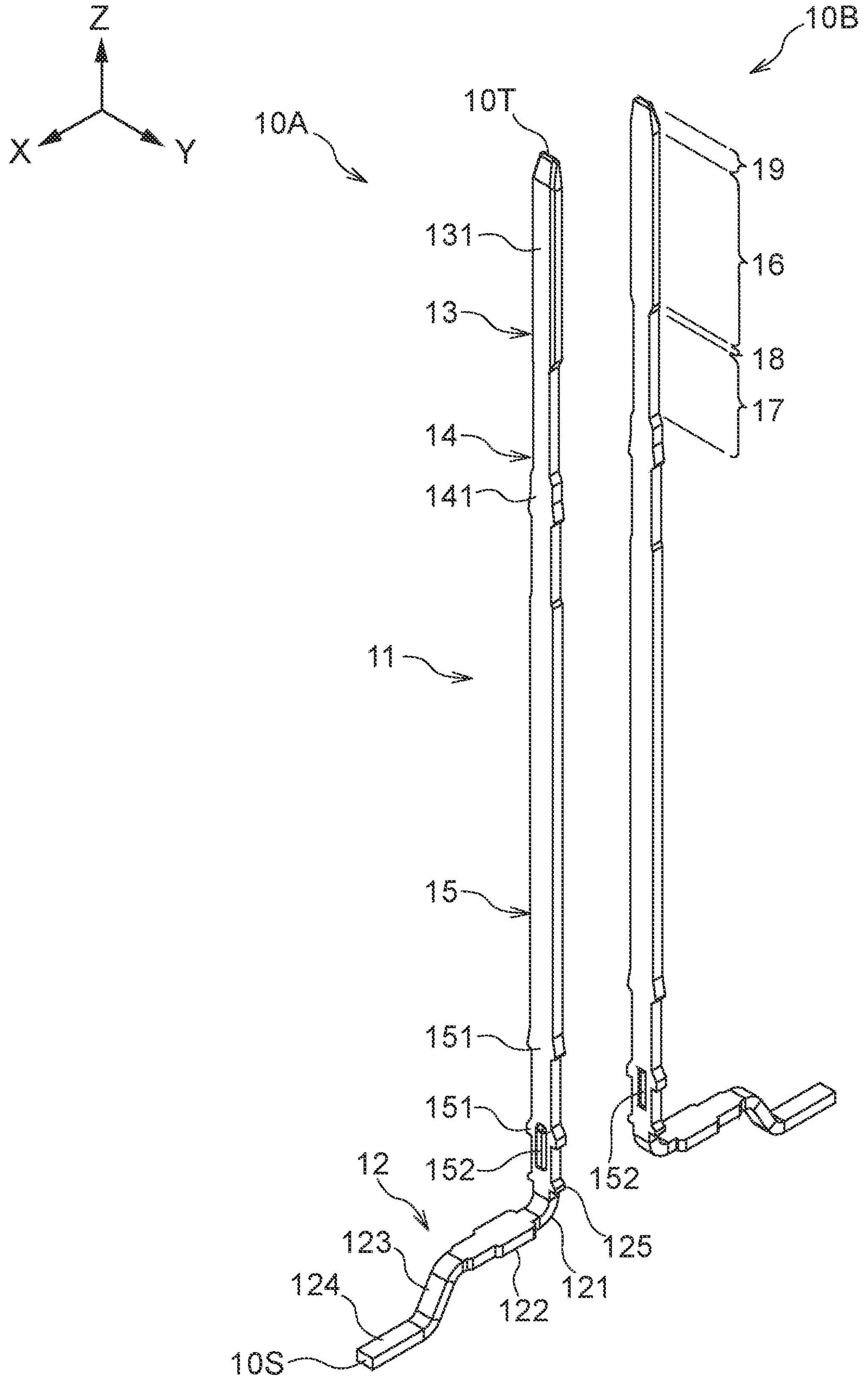
FIG. 17 is a perspective view of a pair of signal terminals of an exemplary embodiment.

The one side signal terminals 10A and the other side signal terminals 10B each have the same structure, and are arrayed in orientations opposing each other in the inter-row direction (see FIG. 17). The plural one side signal terminals 10A each have the same structure and the same orientation as each other, and are arrayed at uniform intervals along the pitch direction. The plural other side signal terminals 10B each have the same structure and the same orientation as each other, and are arrayed at uniform intervals along the pitch direction.

The one side signal terminals 10A and the other side signal terminals 10B are simply referred to as the signal terminals 10 when not particularly discriminating therebetween.

As illustrated in FIG. 10, the plural power source terminals 20 are configured from pairs of one side power source terminals 20A at the pitch direction one side, and pairs of other side power source terminals 20B at the pitch direction other side.

The one side power source terminals 20A are disposed at the pitch direction one side with respect to a region where the plural signal terminals 10 are disposed, and the other side power source terminals 20B are disposed at the pitch direction other side with respect to the region where the plural signal terminals 10 are disposed. The pair of one side power source terminals 20A have a symmetrical structure in the inter-row direction, and the other side power source terminals 20B also have a symmetrical structure in the inter-row direction.

The one side power source terminals 20A and the other side power source terminals 20B are simply referred to as the power source terminals 20 when not particularly discriminating therebetween.

Signal Terminals 10 Details

Figure 7:
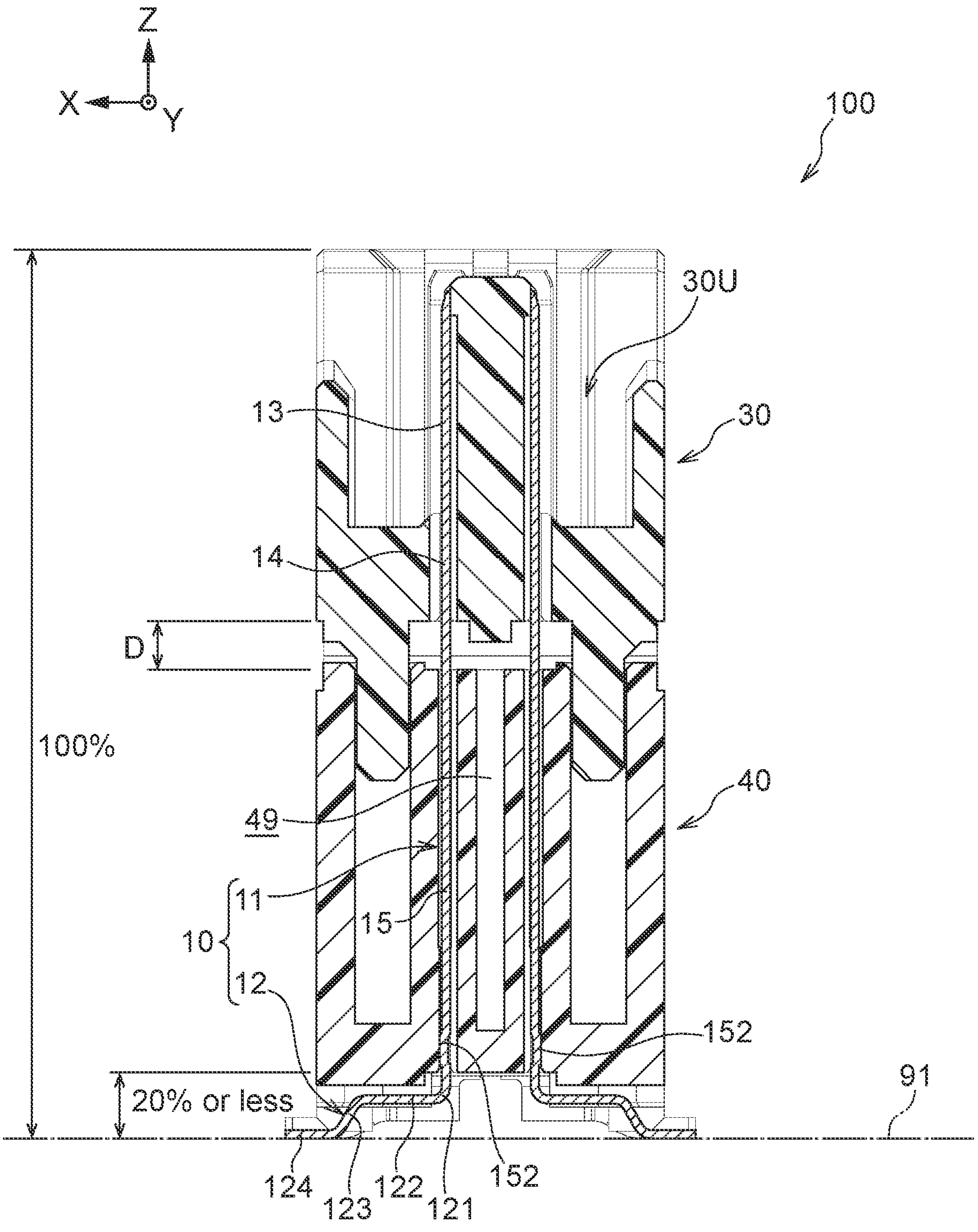
FIG. 7 is a cross-section illustrating a connector of an exemplary embodiment in a state sectioned along a plane orthogonal to the pitch direction (at a pitch direction central position).

As illustrated in FIG. 7 and FIG. 17, the signal terminals 10 each include an insertion portion 11 inserted into the fitting housings 30, 40, and a non-inserted portion 12 not inserted into the fitting housings 30, 40.

The insertion portion 11 extends linearly along an up-down direction, which is the direction of insertion into the housings 30, 40 (called the "insertion direction"). The insertion portion 11 is inserted from below to above with respect to the housings 30, 40. The insertion portion 11 has a plate width direction facing along the pitch direction.

The non-inserted portion 12 is connected to a lower side of the insertion portion 11, and extends from a lower end of the insertion portion 11 toward an inter-row direction outside.

The signal terminals 10 each include a substrate fixed portion 124 for fixing to the substrate 91 by solder or the like. The substrate fixed portion 124 extends linearly in the inter-row direction. The substrate fixed portion 124 is formed as a portion of the non-inserted portion 121.

As illustrated in FIG. 7, the signal terminals 10 include fitting side retained portions 13, 14 retained in the fitting housing 30, and a mounted side retained portion 15 retained in the mounted housing 40. Note that in the present specification, "retaining" a portion of the terminal by the housing means restricting movement of the portion of the terminal in two or more directions by abutting or being in close proximity to the portion of the terminal from the two or more directions including two mutually opposing directions.

The fitting side retained portions 13, 14 each include an exposed portion 13 housed in a signal terminal retaining groove 36 (see FIG. 11 and FIG. 13) formed to the fitting housing 30 and extending in the up-down direction, and a surrounded portion 14 housed in a signal terminal retaining hole 37 formed to the fitting housing 30 and extending in the up-down direction. The exposed portion 13 enters a state abutting or in close proximity with respect to the fitting housing 30 from three directions (the inter-row direction inside and two pitch direction sides) except for at the inter-row direction outside, and the surrounded portion 14 enters a state abutting or in close proximity with respect to the fitting housing 30 from four directions, i.e. from the pitch directions and the inter-row directions.

The mounted side retained portion 15 includes the surrounded portion 15 housed in a signal terminal retaining hole 41 (see FIG. 13) formed in the mounted housing 40 and extending in the up-down direction. The mounted side retained portion 15 (surrounded portion 15) enters a state abutting or in close proximity with respect to the mounted housing 40 from four directions, i.e. from the pitch directions and the inter-row directions.

The fitting side retained portions 13, 14 and the mounted side retained portion 15 are all formed as a portion of the insertion portion 11 extending linearly in the up-down direction (insertion direction).

The fitting side retained portions 13, 14 and the mounted side retained portion 15 are simply referred to as the retained portions 13, 14, 15 when not particularly discriminating therebetween.

As illustrated in FIG. 17, the signal terminals 10 include a conduction contact portion 131 for making conduction contact with the counterpart side connector terminal. The conduction contact portion 131 is formed as a portion of the exposed portion 13 of the fitting side retained portions 13, 14.

Figure 9:
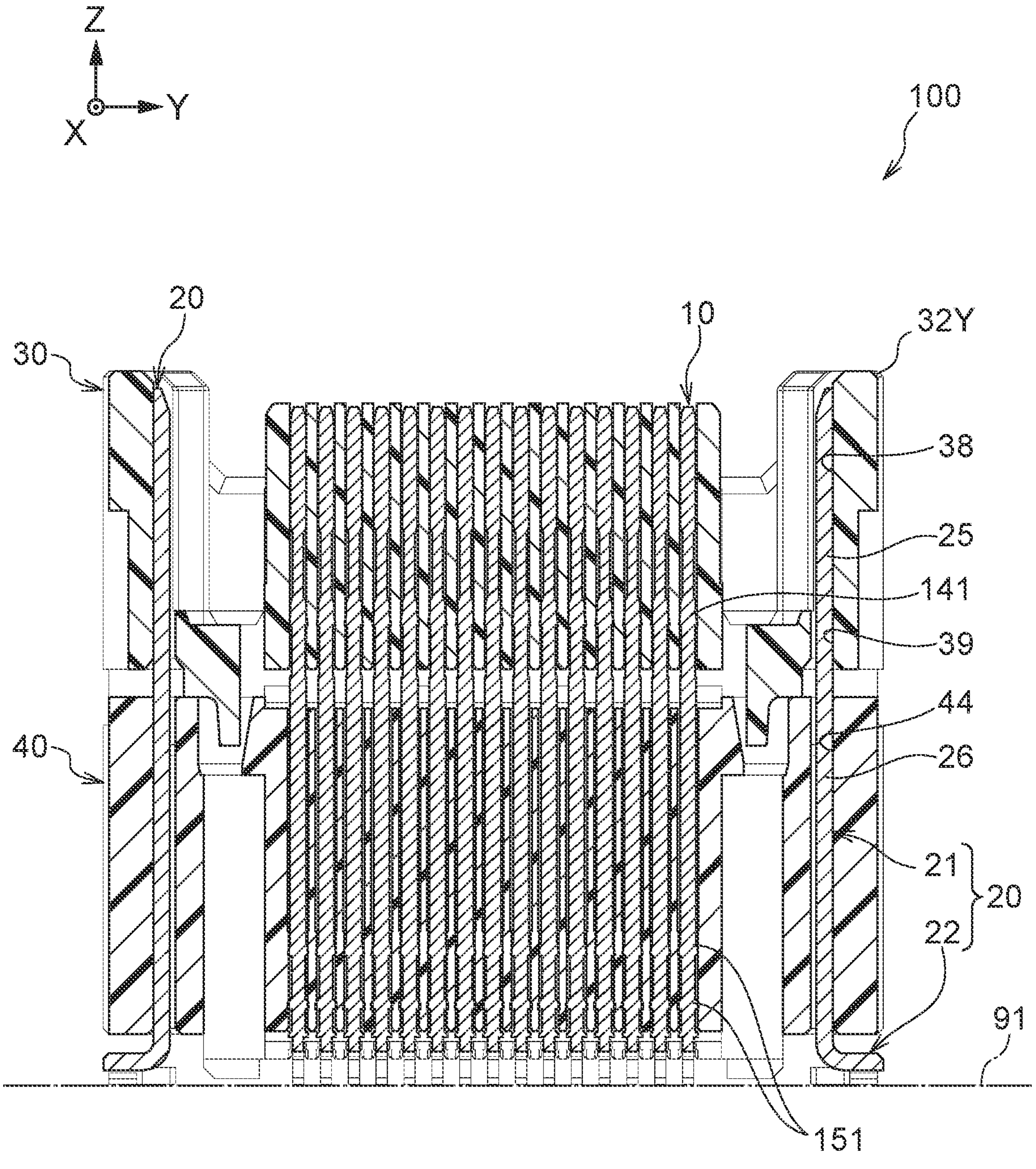
FIG. 9 is a cross-section illustrating a connector of an exemplary embodiment in a state sectioned along a plane orthogonal to the inter-row direction (at a signal terminal position).

As illustrated in FIG. 9 and FIG. 17, the signal terminals 10 each include mounted side press-fit portions 151 that are press-fitted into the mounted housing 40. Anchor projections are formed to the mounted side press-fit portion 151 on both sides in the plate width direction, which are both sides in the pitch direction. There are plural (two) of the mounted side press-fit portions 151 formed. The plural mounted side press-fit portions 151 are all formed at a lower side of an up-down direction center of the mounted side retained portion 15.

The signal terminals 10 each include a fixing side press-fit portion 141 press-fitted into the fitting housing 30. Anchor projections are formed to the fixing side press-fit portion 141 on both sides in the plate width direction, which are both sides in the pitch direction. The fixing side press-fit portion 141 forms a portion of the surrounded portion 14 of the fitting side retained portions 13, 14.

As illustrated in FIG. 7, the non-inserted portion 12 of each of the signal terminals 10 includes a bent portion 121, a first horizontal portion 122, an inclined portion 123, and a second horizontal portion 124.

The bent portion 121 is a portion where a lower side of the insertion portion 11 is bent at substantially 90° toward the inter-row direction outside, and connects the insertion portion 11 and the first horizontal portion 122 together.

The first horizontal portion 122 extends toward the inter-row direction outside at a position separated from and above the substrate 91.

The inclined portion 123 is a portion connecting the first horizontal portion 122 and the second horizontal portion 124 together at an angle, and extends out from the first horizontal portion 122 toward the inter-row direction outside and downward at an angle toward the second horizontal portion 124.

The second horizontal portion 124 is a portion extending from the inclined portion 123 linearly toward the inter-row direction outside, and is disposed along a face of the substrate 91. The second horizontal portion 124 functions as the substrate fixed portion 124.

As illustrated in FIG. 17, the signal terminals 10 include a wide portion 16, and a narrow portion 17 having a smaller width dimension than the wide portion 16. The narrow portion 17 is formed below the wide portion 16, and is connected to the wide portion 16 through a width varying portion 18 having a varying width dimension. The wide portion 16 has a uniform plate width along the up-down direction that is the terminal extension direction, and the narrow portion 17 also has a uniform plate width along the terminal extension direction. The width varying portion 18 is formed so as to gradually increase in plate width on progression from the narrow portion 17 toward the wide portion 16. In a state in which the connector 100 and the counterpart side connector are fitted together up to a fitting limit (a state in which they have approached each other in the fitting direction to a maximum), the position of contact between the signal terminals 10 and the signal terminals of the counterpart side connector is at a lower portion of the wide portion 16 or at the width varying portion 18.

The impedance is raised by forming the narrow portion 17, and reliability of connection of a conduction contact portion to a connection target is secured by the wide portion 16 or width varying portion 18 of wider width.

Each of the signal terminals 10 includes a leading end portion 19. The leading end portion 19 is formed above the wide portion 16 and contiguous to the wide portion 16. The plate width and the plate thickness of the leading end portion 19 gradually decrease on progression in a direction away from the wide portion 16 (upward).

As illustrated in FIG. 7 and FIG. 17, each of the signal terminals 10 includes a bead 152 formed as a portion of the mounted side retained portion 15. The bead 152 is formed so that a plate width direction center portion of the mounted side retained portion 15 bulges toward the inter-row direction outside. The bead 152 extends in the up-down direction. The position where the bead 152 is formed on the mounted side retained portion 15 is a position overlapping in the up-down direction (insertion direction) with the mounted side press-fit portion 151 at the lower side from out of the plural (two) mounted side press-fit portions 151. The bead 152 facilitates arranging the mounted side retained portion 15 at a position shifted toward the inter-row direction inside of the signal terminal retaining hole 41 of the mounted housing 40.

As illustrated in FIG. 17, each of the signal terminals 10 includes a press portion 125 for insertion of the signal terminals 10 into the housings 30, 40. The press portion 125 is formed directly above the bent portion 121 of the non-inserted portion 12 and has an enlarged plate width. The press portion 125 is pressed upward when the signal terminal 10 is inserted into the housings 30, 40.

Power Source Terminal 20 Details

Figure 18:
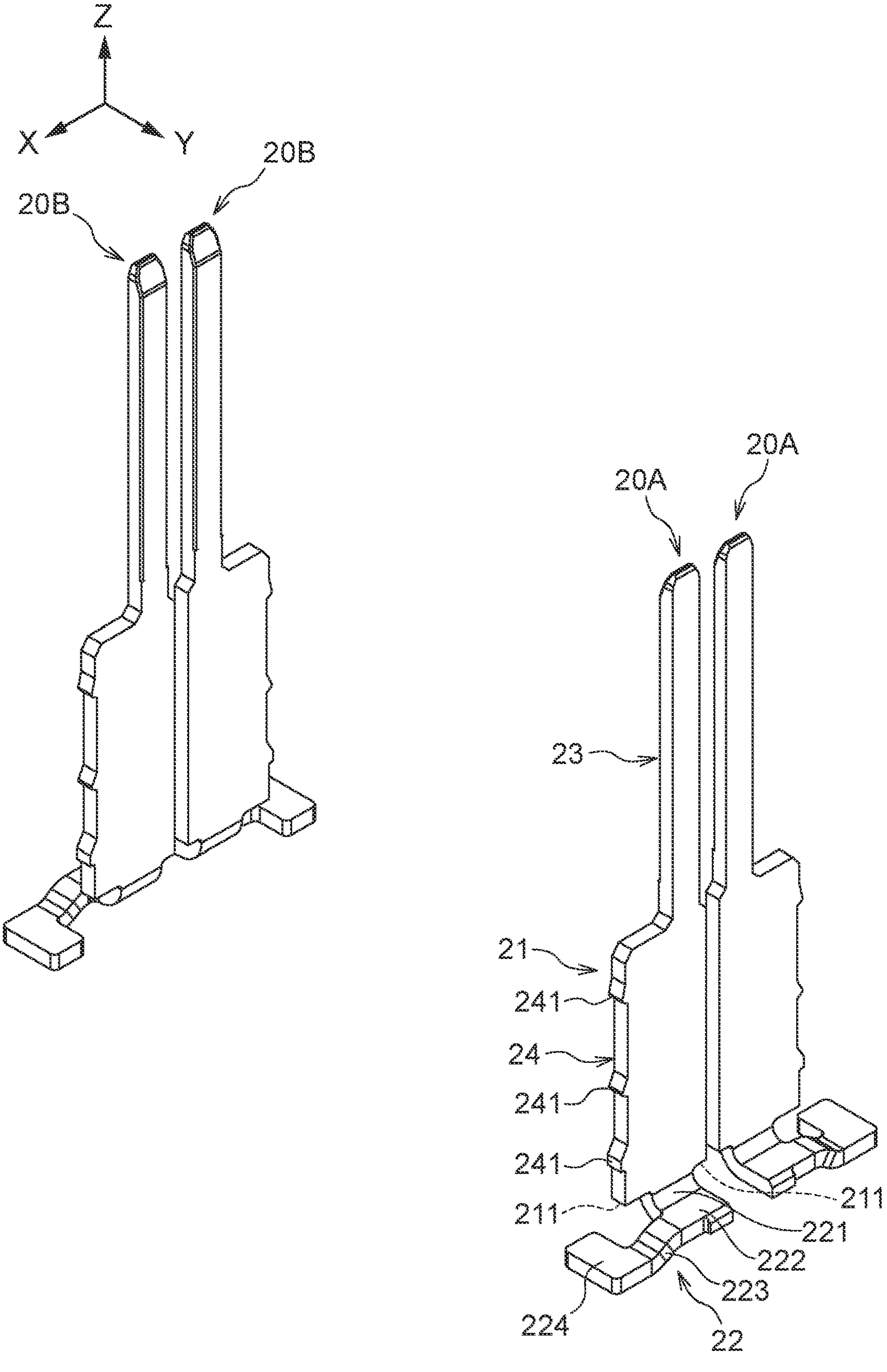
FIG. 18 is a perspective view of plural power source terminals of an exemplary embodiment.

As illustrated in FIG. 9 and FIG. 18, each of the power source terminals 20 includes an insertion portion 21 inserted into the housings 30, 40 extending in the up-down direction, and a non-inserted portion 22 not inserted into the housings 30, 40. The insertion portion 21 has a plate width direction oriented in the inter-row direction. The non-inserted portion 22 is connected to a lower side of the insertion portion 21.

Figure 8:
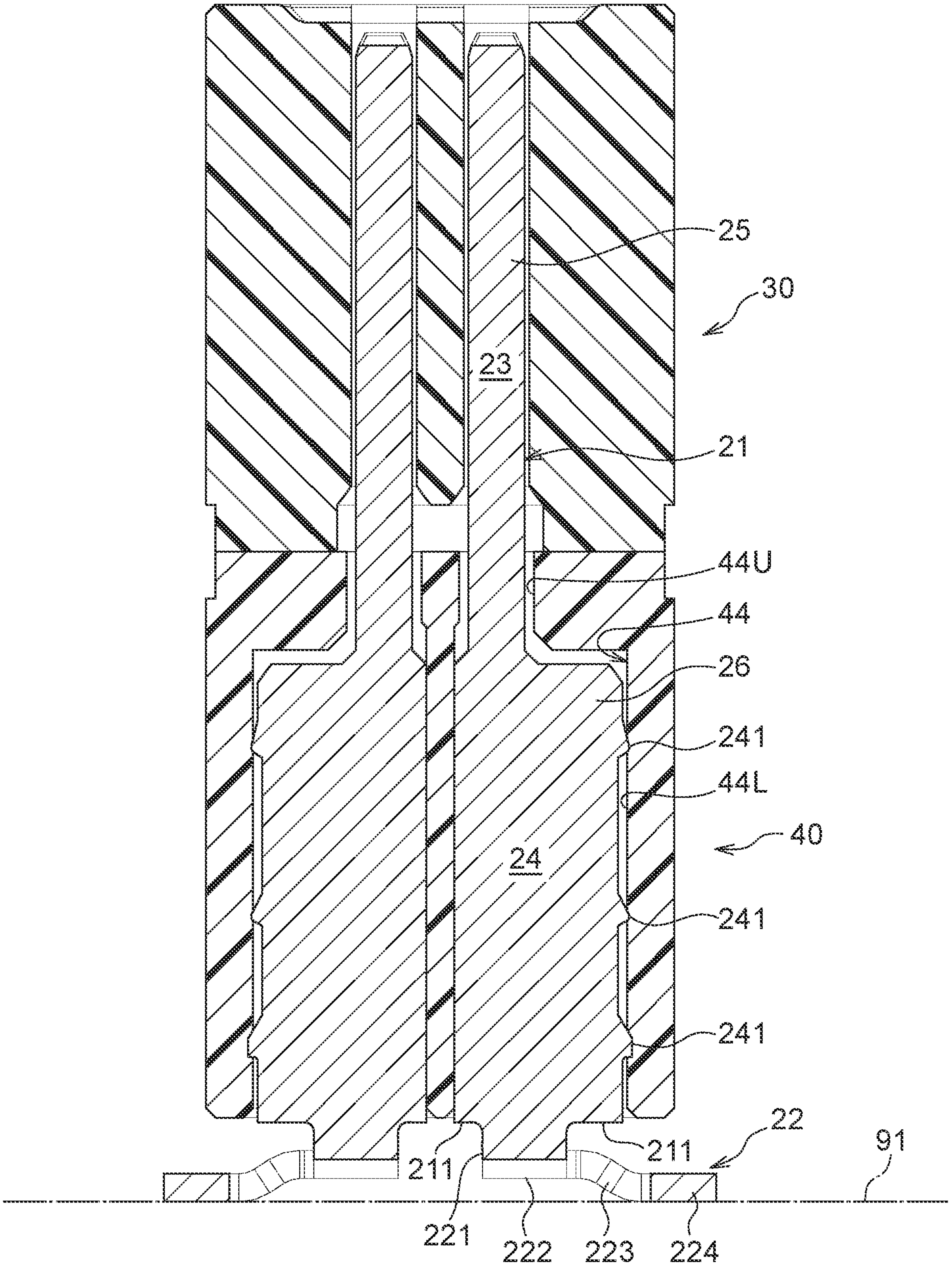
FIG. 8 is a cross-section illustrating a connector of an exemplary embodiment in a state sectioned along a plane orthogonal to the pitch direction (at a power source terminal position).

As illustrated in FIG. 8 and FIG. 18, the insertion portion 21 includes a narrow portion 23 configuring an upper portion thereof, and a wide portion 24 configuring a lower portion thereof.

As illustrated in FIG. 8 and FIG. 9, the insertion portion 21 includes a fitting side retained portion 25 retained in the fitting housing 30, and a mounted side retained portion 26 retained in the mounted housing 40.

A portion of the upper side of the narrow portion 23 configures the fitting side retained portion 25, and all of the wide portion 24 and a portion of a lower side of the narrow portion 23 configure the mounted side retained portion 26.

As illustrated in FIG. 8 and FIG. 18, each of the power source terminals 20 includes anchor projections 241 for press-fitting into the mounted housing 40. The anchor projections 241 are formed to the wide portion 24. The anchor projection 241 are formed to only one side (the inter-row direction outside) from out of the plate width directions. There are plural (three) of the anchor projections 241 formed along the up-down direction (insertion direction). The uppermost anchor projection 241 from out of the plural anchor projections 241 is formed above an up-down direction center of the mounted side retained portion 26, and the lowermost anchor projection 241 is formed below the up-down direction center of the mounted side retained portion 26.

The power source terminals 20 do not, however, include an anchor projection for press-fitting into the fitting housing 30.

As illustrated in FIG. 18, the non-inserted portion 22 includes a bent portion 221, a first horizontal portion 222, an inclined portion 223, and a second horizontal portion 224.

The bent portion 221 is a portion where the lower side of the insertion portion 21 has been bent at substantially 90° toward the pitch direction outside, and is connected to the insertion portion 21 and the first horizontal portion 222.

The first horizontal portion 222 is disposed at a position above and separated from the substrate 91 and has a plate thickness direction oriented in the up-down direction. The first horizontal portion 222 is formed at the pitch direction outside with respect to the insertion portions 11.

The inclined portion 223 is positioned at the inter-row direction outside with respect to the first horizontal portion 222. The inclined portion 223 connects the second horizontal portion 224 and the first horizontal portion 222 together at an angle.

The second horizontal portion 224 has a plate thickness direction oriented in the up-down direction and is formed at the inter-row direction outside with respect to the inclined portion 223. The second horizontal portion 224 functions as a substrate fixed portion 224 fixed to the substrate by soldering. The second horizontal portion 224 is configured from a portion positioned at the inter-row direction outside of the inclined portion 223, and a portion widened toward the pitch direction inside with respect to this portion.

As illustrated in FIG. 8, a pair of abutting faces 211 are formed at a lower end of the insertion portion 21 at both sides in the plate width direction (inter-row direction) of a portion connected to the non-inserted portion 22. In order to insert the power source terminals 20 upward from below with respect to the housings 30, 40, a jig or the like is abutted against the pair of abutting faces 211 and then pressed upward. The non-inserted portion 22 is connected at a position toward the connector inter-row direction center with respect to a plate width direction center of (the wide portion 24 of) the insertion portions 11.

The narrow portion 23 is connected to the wide portion 24 at a position toward the connector inter-row direction center with respect to the plate width direction center of the wide portion 24. More specifically, the narrow portion 23 extends along the up-down direction with a uniform plate width. The end on the inter-row direction outside from out of the plate width directions of the narrow portion 23 is positioned further to the connector inter-row direction inside than the centroid of the wide portion 24 as viewed along the plate thickness direction (the centroid thereof as viewed along the same direction as FIG. 8).

Housings 30, 40

As illustrated in FIG. 11 to FIG. 16, the housings 30, 40 are configured from the fitting housing 30 serving as a "first housing", and the mounted housing 40 serving as a "second housing".

Fitting Housing 30 (First Housing)

The fitting housing 30 configures an upper portion of the housings 30, 40.

Figure 16:
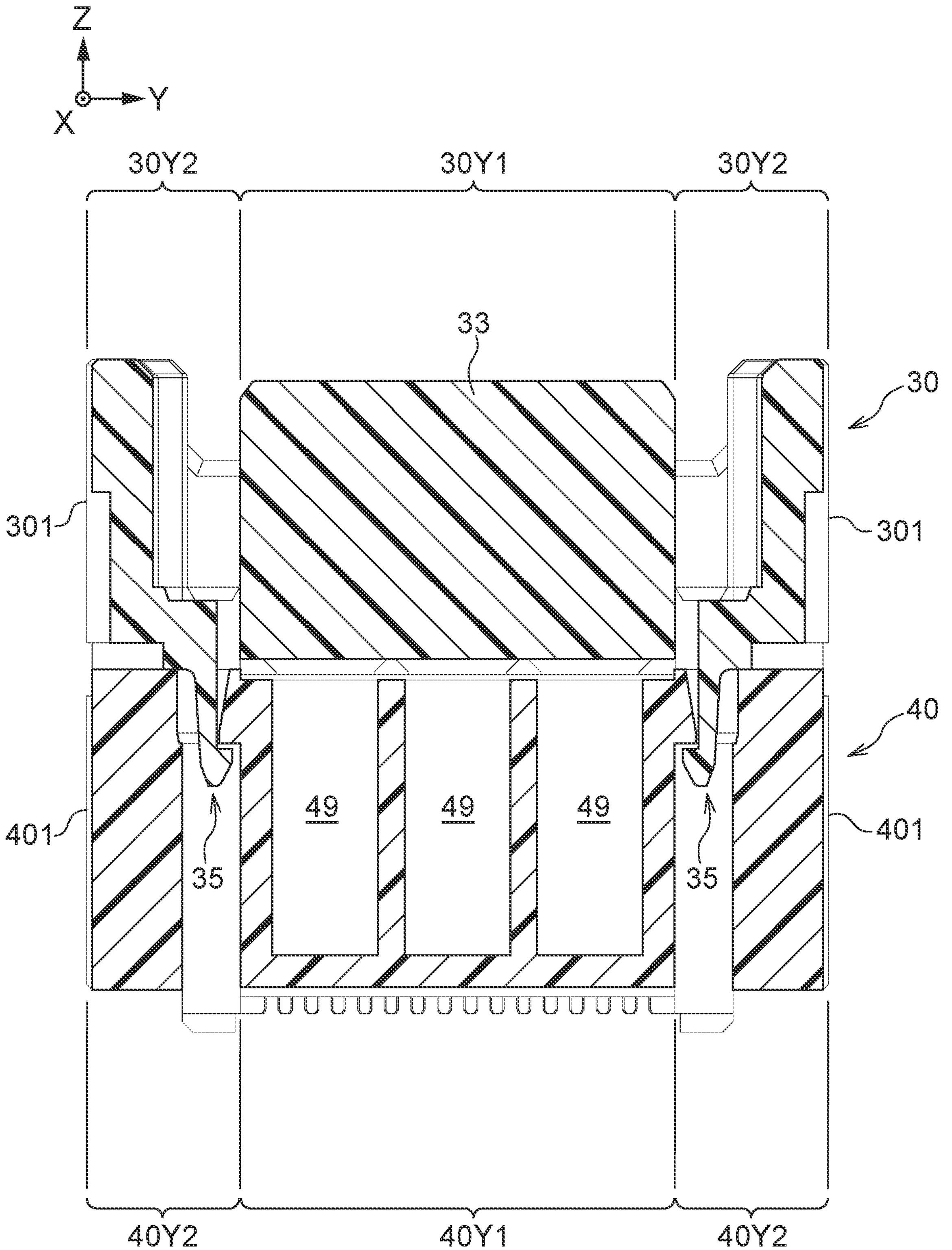
FIG. 16 is a cross-section illustrating a housing of an exemplary embodiment in a state sectioned along a plane orthogonal to the inter-row direction.

As illustrated in FIG. 16, the fitting housing 30 is configured from a pitch direction central portion 30Y1 configuring a pitch direction central portion thereof, and a pair of pitch direction outside portions 30Y2 configuring pitch direction outside portions thereof.

Figure 14:
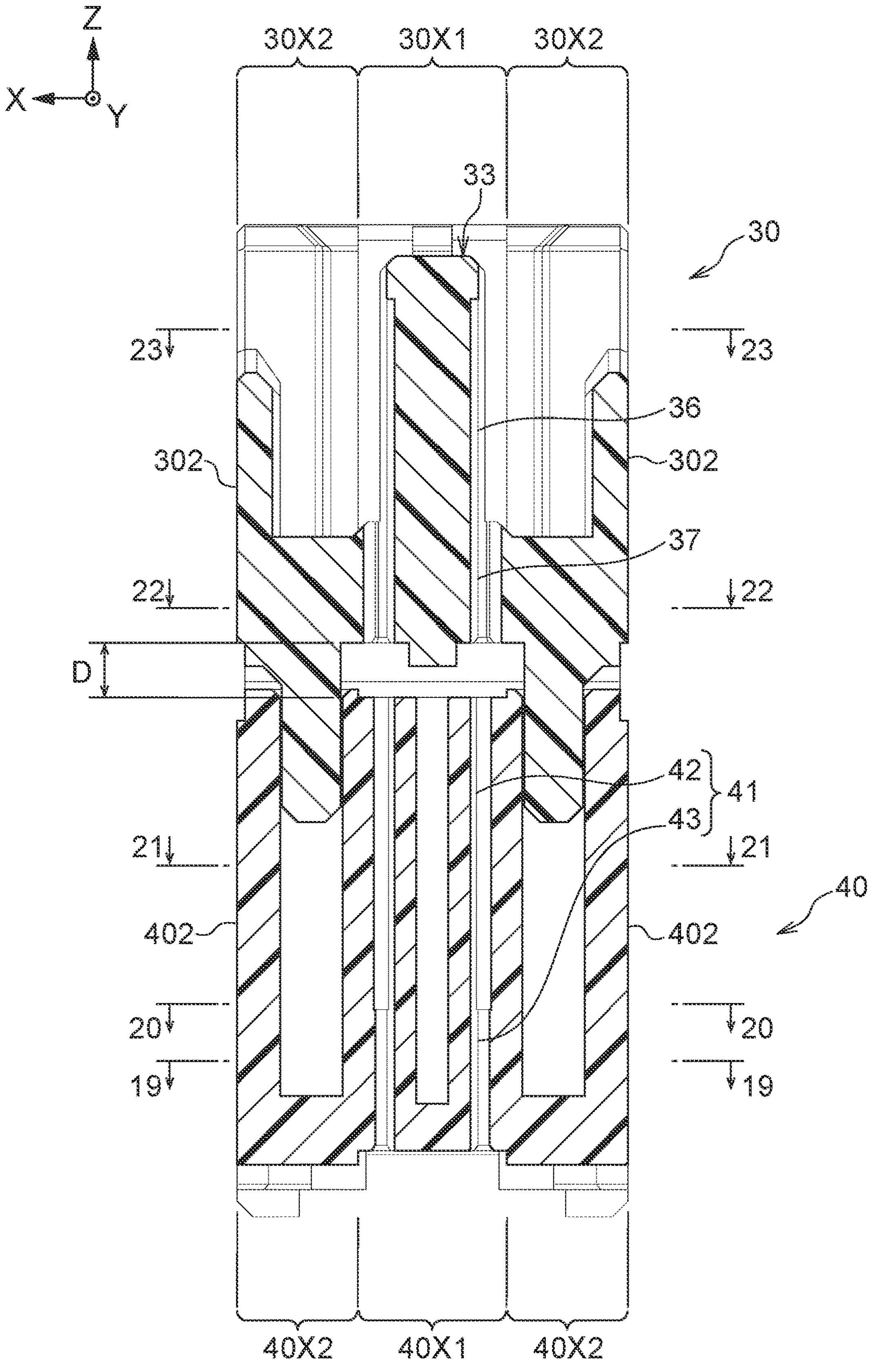
FIG. 14 is a cross-section illustrating a housing of an exemplary embodiment in a state sectioned along a plane orthogonal to the pitch direction.

Moreover, as illustrated in FIG. 14, the fitting housing 30 is configured from an inter-row direction central portion 30X1 configuring an inter-row direction central portion thereof, and a pair of inter-row direction outside portions 30X2 configuring inter-row direction outside portions thereof.

Figure 11:
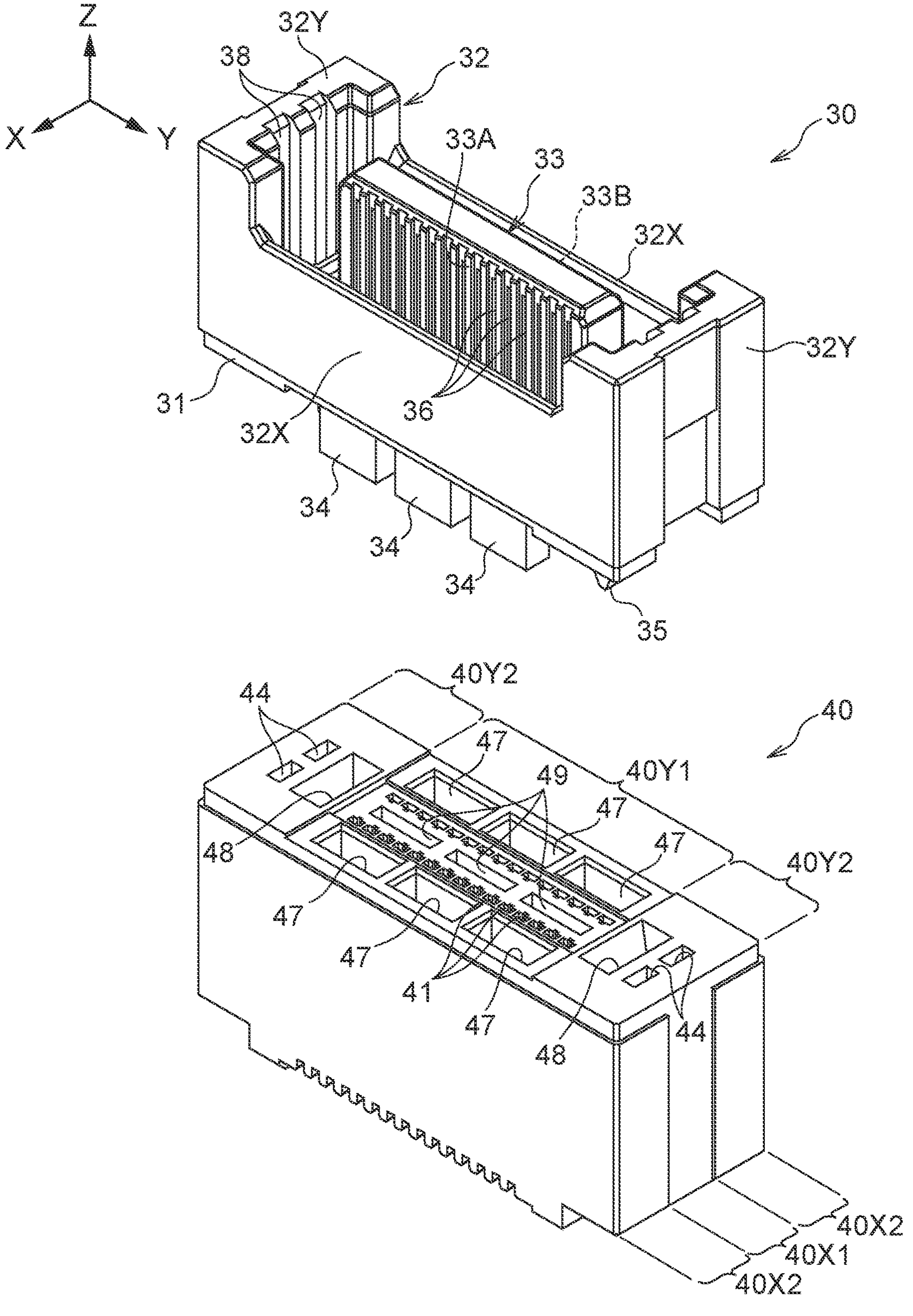
FIG. 11 is an exploded perspective view of a housing of an exemplary embodiment.
Figure 12:
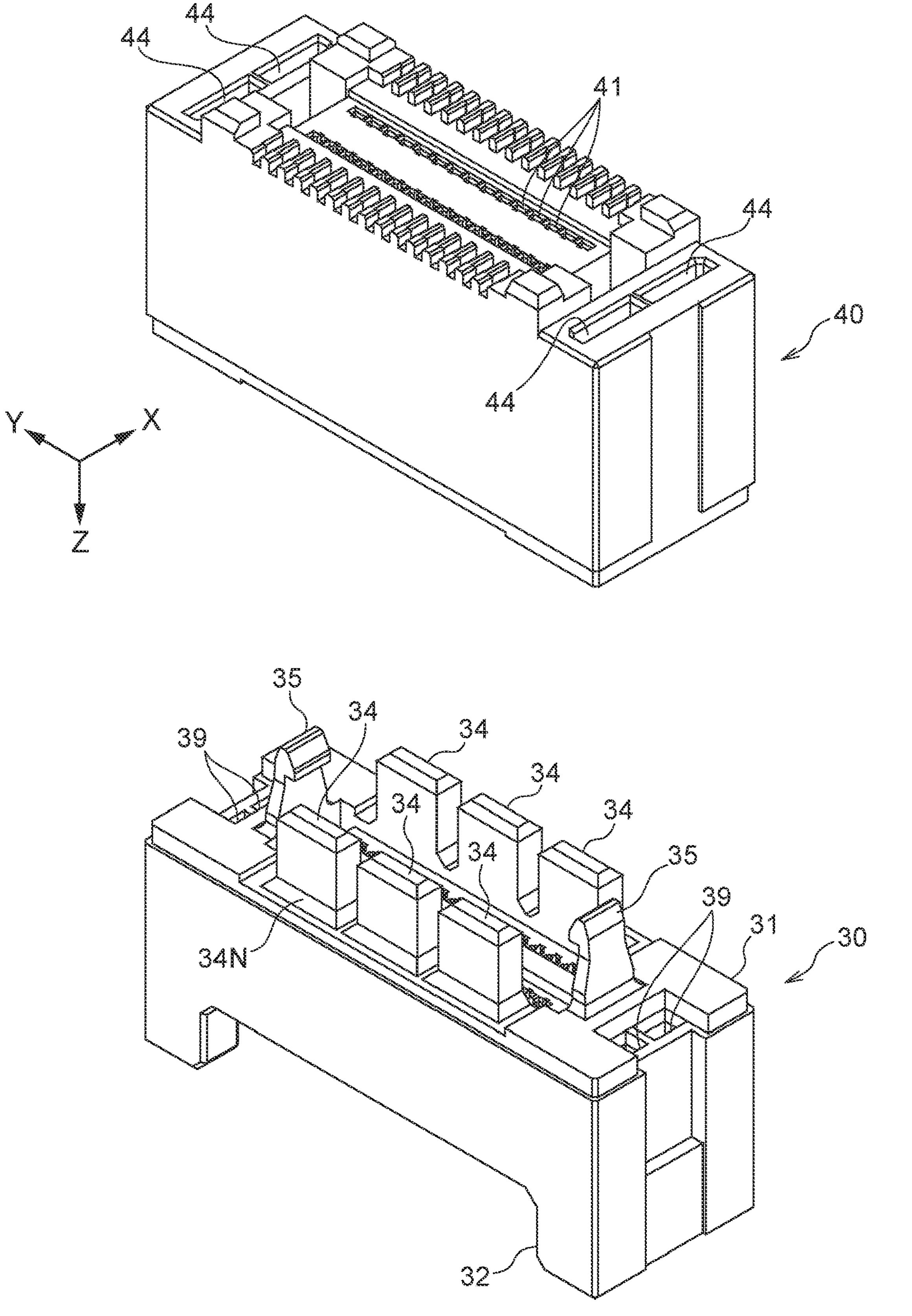
FIG. 12 is an exploded perspective view of a housing of an exemplary embodiment, as viewed from below.
Figure 13:
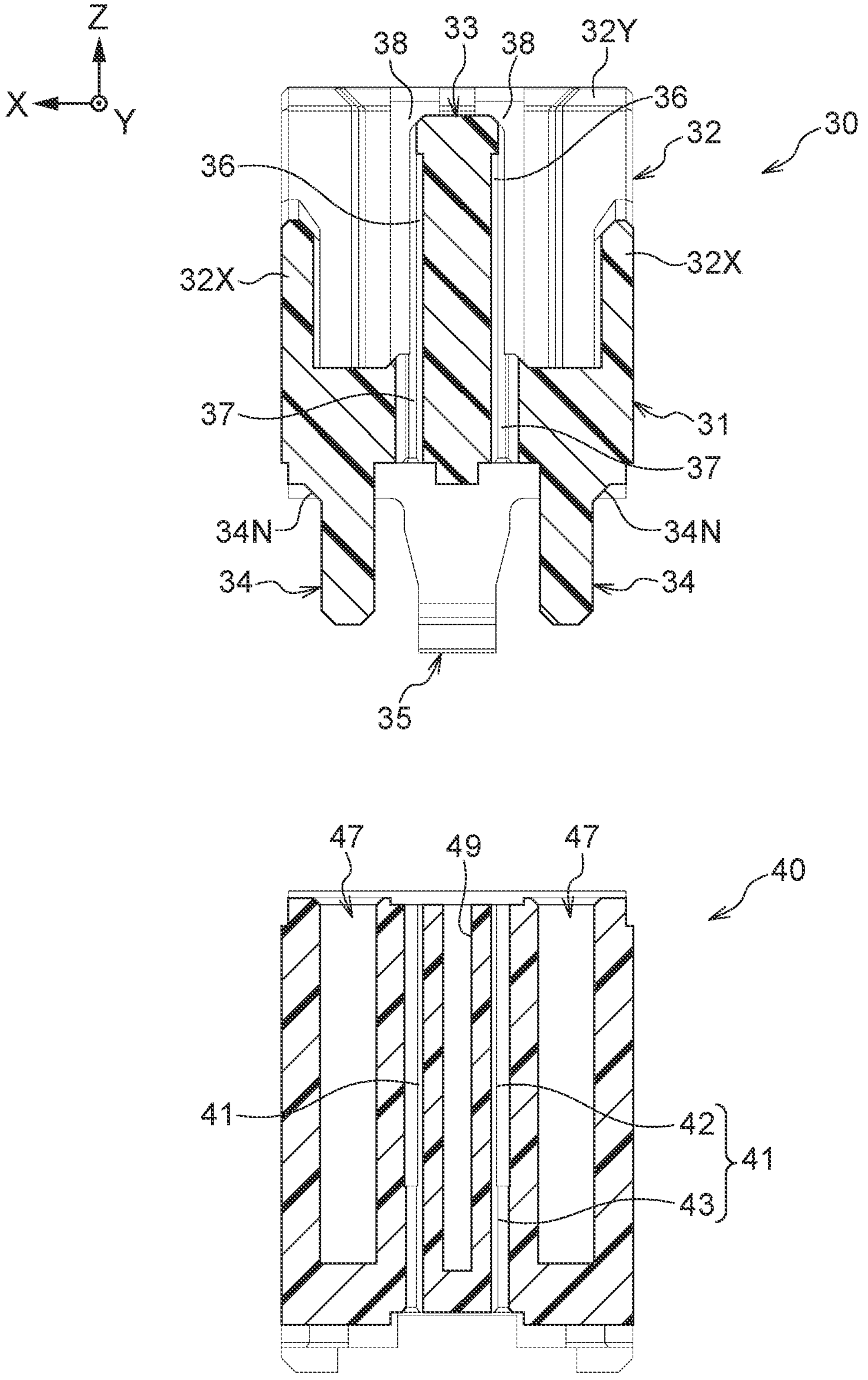
FIG. 13 is an exploded cross-section illustrating a housing of an exemplary embodiment in a state sectioned along a plane orthogonal to the pitch direction.

As illustrated in FIG. 11, FIG. 12, and FIG. 13, the fitting housing 30 includes a bottom wall 31, a peripheral wall 32 upstanding from a peripheral edge of the bottom wall 31, a projecting wall 33 projected upward from the center of the bottom wall 31, plural (six) positioning protrusions 34 projected downward from the bottom wall 31, and a pair of projection claws 35 projected downward from the bottom wall 31.

A fitting indentation 30U is formed to the fitting housing 30 for disposing a portion of the counterpart side connector in when the connector 100 is connected to the counterpart side connector. The fitting indentation 30U is a space above the bottom wall 31 of the fitting housing 30, and is a space surrounded by the peripheral wall 32.

Signal Terminal Retaining Grooves 36

The projecting wall 33 upstands from the center of the bottom face of the fitting indentation 30U upward. The projecting wall 33 is a wall extending along the pitch direction, and includes a pair of wall faces 33A, 33B at both wall thickness direction (inter-row direction) sides. Plural signal terminal retaining grooves 36 for retaining the signal terminals 10 are formed to the pair of wall faces 33A, 33B of the projecting wall 33 in rows along the pitch direction. The projecting wall 33 is formed at the pitch direction central portion 30Y1 and the inter-row direction central portion 30X1 of the fitting housing 30.

The signal terminal retaining grooves 36 correspond to a "first side retaining portion".

Signal Terminal Retaining Holes 37

Signal terminal retaining holes 37 are formed in the bottom wall 31 of the fitting housing 30 so as to penetrate the bottom wall 31 in the up-down direction. The signal terminal retaining holes 37 are formed below the signal terminal retaining grooves 36 and are contiguous to the signal terminal retaining grooves 36.

The signal terminal retaining holes 37 correspond to a "first side surrounding portion" of the "first side retaining portion".

The signal terminal retaining grooves 36 and the signal terminal retaining holes 37 are referred to as signal terminal retaining portions 36, 37 when not particularly discriminating therebetween. The signal terminal retaining portions 36, 37 are formed at the pitch direction central portion 30Y1 and the inter-row direction central portion 30X1 of the fitting housing 30.

As illustrated in FIG. 11, the peripheral wall 32 of the fitting housing 30 is configured from a pair of pitch direction walls 32Y extending in the inter-row direction at both pitch direction sides, and a pair of inter-row direction walls 32X extending in the pitch direction at both inter-row direction sides.

The pitch direction walls 32Y are formed at a uniform height in an entire range from one inter-row direction end of the fitting housing 30 to the other end thereof. However, the inter-row direction walls 32X are walls lower in height than the pitch direction walls 32Y, and are only formed in a range between one pitch direction wall 32Y and the other pitch direction wall 32Y from out of an entire range from one pitch direction end of the fitting housing 30 to the other end thereof. The height of the pitch direction walls 32Y is higher than the projecting wall 33, and the height of the inter-row direction walls 32X is lower than the projecting wall 33.

Power Source Terminal Retaining Grooves 38

As illustrated in FIG. 9 and FIG. 11, power source terminal retaining grooves 38 are formed to a wall face at the pitch direction inside of the pitch direction walls 32Y so as to extend in the up-down direction. There are a total of four of the power source terminal retaining grooves 38 formed, with two formed to each of the pair of pitch direction walls 32Y.

The power source terminal retaining grooves 38 correspond to the "first side retaining portion".

Power Source Terminal Retaining Holes 39

As illustrated in FIG. 9, power source terminal retaining holes 39 are formed to the fitting housing 30 so as to extend in the up-down direction. The power source terminal retaining holes 39 are formed below the power source terminal retaining grooves 38 and are contiguous to the power source terminal retaining grooves 38.

The power source terminal retaining holes 39 correspond to a "first side surrounding portion" of the "first side retaining portion".

The power source terminal retaining grooves 38 and the power source terminal retaining holes 39 are referred to as power source terminal retaining portions 38, 39 when not particularly discriminating therebetween. The power source terminal retaining portions 38, 39 are formed at the pitch direction outside portions 30Y2 and the inter-row direction central portion 30X1 of the fitting housing 30.

Figure 15:
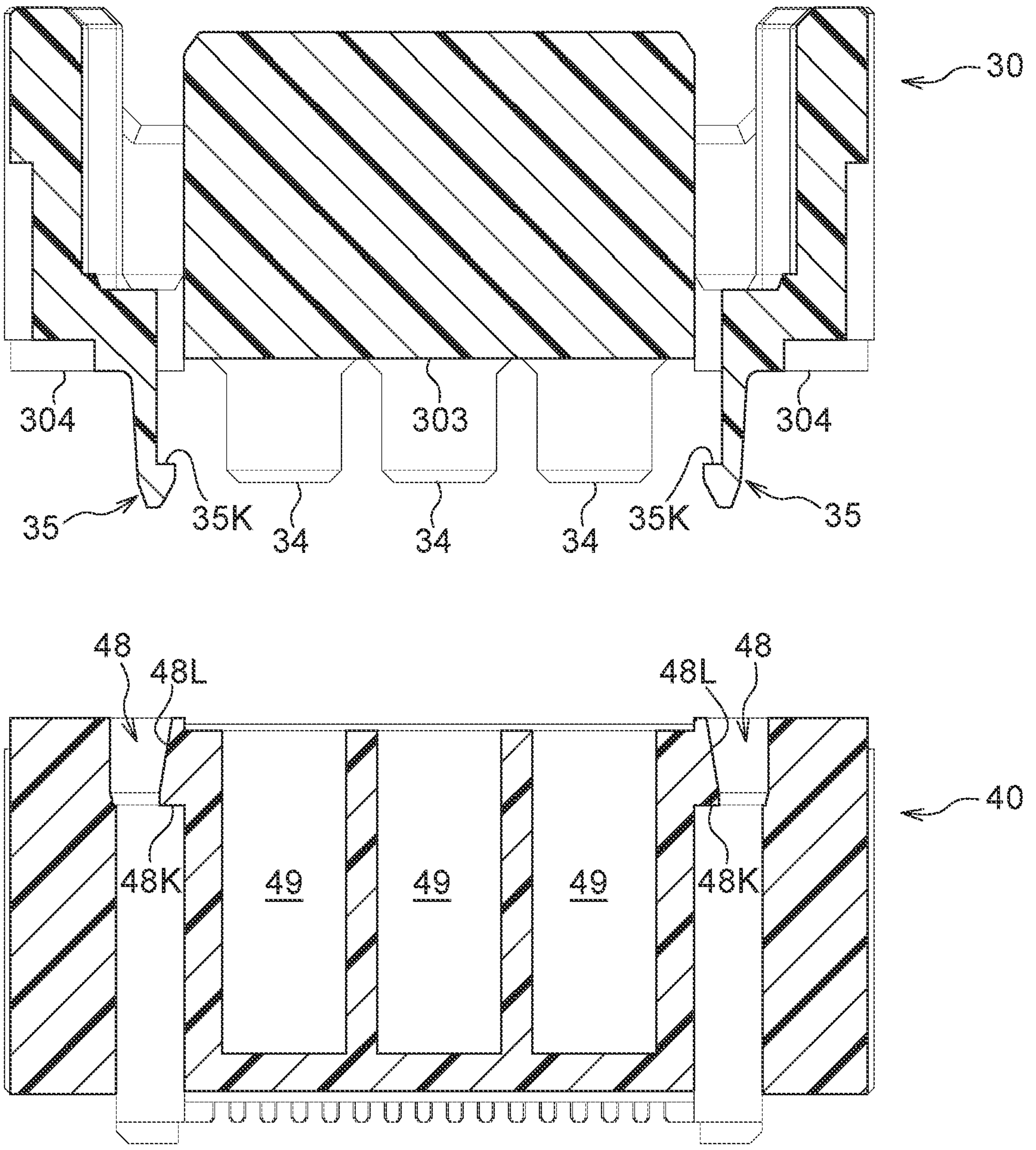
FIG. 15 is an exploded cross-section illustrating a housing of an exemplary embodiment in a state sectioned along a plane orthogonal to the inter-row direction.

As illustrated in FIG. 15, a lower face 303 of the pitch direction central portion 30Y1 of the fitting housing 30 is positioned further upward than a lower face 304 of the pitch direction outside portions 30Y2, so as not to contact an upper face of the mounted housing 40.

Mounted Housing 40 (Second Housing)

The mounted housing 40 configures a lower portion of the housings 30, 40.

The mounted housing 40 has a substantially cuboidal shape.

More specifically, in plan view the mounted housing 40 has a long side direction along the pitch direction, and a short side direction along the inter-row direction. The mounted housing 40 has a vertically long shape, with an up-down dimension of the mounted housing 40 greater than a short side direction (inter-row direction) dimension of the mounted housing 40.

As illustrated in FIG. 16, the mounted housing 40 is configured from a pitch direction central portion 40Y1 configuring a pitch direction central portion thereof, and from a pair of pitch direction outside portions 40Y2 configuring pitch direction outside portions thereof.

Moreover, as illustrated in FIG. 14, the mounted housing 40 is configured from an inter-row direction central position 40X1 configuring an inter-row direction central portion thereof, and from a pair of inter-row direction outside portions 40X2 configuring inter-row direction outside portions thereof.

Signal Terminal Retaining Hole 41

As illustrated in FIG. 11 and FIG. 13, signal terminal retaining holes 41 are formed to the mounted housing 40 so as to penetrate the mounted housing 40 in the up-down direction.

The signal terminal retaining holes 41 extend linearly in the up-down direction. There are plural of the signal terminal retaining holes 41 formed corresponding to the plural signal terminals 10. The plural signal terminal retaining holes 41 are formed at the pitch direction central portion 40Y1 and the inter-row direction central position 40X1 of the mounted housing 40.

The signal terminal retaining holes 41 correspond to a "second side surrounding portion" of the "second side retaining portion".

The plural signal terminal retaining holes 41 are configured from plural signal terminal retaining holes 41 on the inter-row direction one side, and plural signal terminal retaining holes 41 on the inter-row direction other side.

Power Source Terminal Retaining Holes 44

Power source terminal retaining holes 44 are formed in the mounted housing 40 so as to penetrate the mounted housing 40 in the up-down direction.

There are plural of the power source terminal retaining holes 44 formed corresponding to the plural power source terminals 20.

The power source terminal retaining holes 44 correspond to a "surrounding portion" of the "second side retaining portion" of the present disclosure.

The plural power source terminal retaining holes 44 are configured from a pair of the power source terminal retaining holes 44 on the pitch direction one side, and a pair of the power source terminal retaining holes 44 on the pitch direction other side. The pair of the power source terminal retaining holes 44 on the pitch direction one side and the pair of the power source terminal retaining holes 44 on the pitch direction other side are respectively formed in the pitch direction outside portions 40Y2 of the mounted housing 40. The power source terminal retaining holes 44 are formed not only in the inter-row direction central position 40X1 of the mounted housing 40, but also in the inter-row direction outside portions 40X2 (see FIG. 8).

As illustrated in FIG. 8, the power source terminal retaining holes 44 each include a wide retaining portion 44L for retaining the wide portion 24 of the insertion portion 21 of the power source terminals 20, and a narrow retaining portion 44U for retaining a lower portion of the narrow portion 23 of the insertion portion 21 of the power source terminals 20. The width of the wide retaining portion 44L in the inter-row direction is larger than the width of the narrow retaining portion 44U in the inter-row direction.

As illustrated in FIG. 11 and FIG. 13, central hollowed portions 49 are formed between the plural signal terminal retaining holes 41 on the inter-row direction one side, and the plural signal terminal retaining holes 41 on the inter-row direction other side.

The central hollowed portions 49 are portions where resin of the mounted housing 40 is not present, and are spaces open to the upper face of the mounted housing 40. Similarly to the plural signal terminal retaining holes 41, the central hollowed portions 49 are also formed at the pitch direction central portion 40Y1 and the inter-row direction central position 40X1 of the mounted housing 40. There are plural (three in the drawings) of the central hollowed portions 49 formed in a row along the pitch direction. Each of the plural central hollowed portions 49 is a substantially cuboidal space.

XY Direction Displacement Restricting Mechanisms 34, 47

The fitting housing 30 and the mounted housing 40 include XY direction displacement restricting mechanisms 34, 47 to restrict any mutual displacement in the XY directions due to the housings 30, 40 abutting each other to displacement of a predetermined range.

The XY direction displacement restricting mechanisms 34, 47 are configured including the positioning protrusions

34 of the fitting housing 30 and positioning indentations 47 of the mounted housing 40. The XY direction mutual displacement of the fitting housing 30 and the mounted housing 40 is restricted to displacement of the predetermined range by the positioning protrusion 34 of the fitting housing 30 being inserted inside the positioning indentation 47 of the fitting housing 30.

More specific explanation follows.

As illustrated in FIG. 11, the plural positioning indentations 47 are formed in the mounted housing 40.

The positioning indentations 47 are portions indented downward from the upper face of the mounted housing 40. The space formed by each of the positioning indentations 47 is substantially cuboidal shaped with sides facing in the XYZ directions. A beveled face to guide the positioning protrusion 34 into the positioning indentation 47 is formed around the opening edge of each of the positioning indentations 47.

As illustrated in FIG. 11 and FIG. 12, plural positioning protrusions 34 are formed to the fitting housing 30.

The positioning protrusions 34 are each a portion projected downward from the lower face of the fitting housing 30. Each of the positioning protrusions 34 has a substantially cuboidal shape with sides facing in the XYZ directions. A beveled face to be guided into the positioning indentation 47 is formed to a lower end portion (leading end portion) of the positioning protrusion 34.

As illustrated in FIG. 12 and FIG. 13, a root portion 34N is formed to an upper end portion (base end portion) of the positioning protrusion 34 with an XY direction dimension that gets larger on progression toward the base end side. The root portion 34N has a dimension enlarged toward both pitch direction sides and toward the inter-row direction outside, and a dimension not enlarged toward the inter-row direction inside.

The plural positioning indentations 47 and the plural positioning protrusions 34 configuring the XY direction displacement restricting mechanisms 34, 47 (hereafter referred to as a "one side displacement restricting mechanism") are configured from plural positioning indentations 47 and plural positioning protrusions 34 on the inter-row direction one side, and plural positioning indentations 47 and plural positioning protrusions 34 on the inter-row direction other side (hereafter referred to as an "other side displacement restricting mechanism". In plan view, the plural signal terminal retaining portions 36, 37, 41 for retaining the signal terminals 10 are formed between the one side displacement restricting mechanism and the other side displacement restricting mechanism.

The XY direction displacement restricting mechanisms 34, 47 are configured so as to enable the fitting housing 30 to displace with respect to the mounted housing 40 over a predetermined range in both the XY directions in a state in which the plural positioning protrusions of the connector are respectively inserted into the plural positioning indentations 47.

This thereby enables a state to be avoided in which the positioning protrusions 34 are unable to be inserted into the positioning indentations 47 due to manufacturing tolerances when molding the mounted housing 40 and the fitting housing 30 from resin. The mold for forming the mounted housing 40 and the mold for forming the fitting housing 30 are implemented in such a configuration by appropriate design.

In the fitting housing 30 and the mounted housing 40 the pairs of pitch direction outside portions 30Y2, 40Y2 contact each other in the up-down direction, and the pitch direction central portions 30Y1, 40Y1 do not contact each other in the up-down direction. Due to adopting such a configuration, contact between the mounted housing 40 and the fitting housing 30 is not liable to occur at the pitch direction central portions 30Y1, 40Y1 even in cases in which there has been a slight amount of deformation of the mounted housing 40 or the fitting housing 30 due to heat or the like.

Note that deformation of the housings and warping of the center portion of the housings readily occurs due to heat or the like. Thus, suppose the mounted housing 40 and the fitting housing 30 were to contact each other at a central portion of the housings, then there would be a concern that unintentional force might be imparted by the housings to each other during deformation due to heat or the like.

Z Direction Separation Prevention Mechanism

As illustrated in FIG. 15 and FIG. 16, the fitting housing 30 and the mounted housing 40 include separation prevention mechanisms 35, 48 to prevent separation from each other in the Z direction (assembly direction).

The separation prevention mechanisms 35, 48 are configured including anchor indentations 48 of the mounted housing 40 and projection claws 35 of the fitting housing 30. The fitting housing 30 and the mounted housing 40 are prevented from separating from each other by the projection claws 35 being anchored to the anchor indentation 48.

Specific explanation thereof follows.

As illustrated in FIG. 15, the fitting housing 30 includes a pair of the projection claws 35. The pair of the projection claws 35 are configured from a pitch direction one side projection claw 35, and a pitch direction other side projection claw 35. The pair of projection claws 35 have the same structure as each other, albeit structures with symmetry in the pitch direction. An engagement portion 35K is formed to each of the projection claws 35 for engaging with an anchor portion 48K of each of the anchor indentations 48. The engagement portion 35K is formed on the pitch direction inside of the projection claw 35.

The mounted housing 40 includes a pair of the anchor indentations 48. The anchor indentations 48 are configured from a pitch direction one side anchor indentation 48 and a pitch direction other side anchor indentation 48.

A beveled face 48L is formed to the anchor indentation 48 so as to gradually deform the projection claw 35 during assembly. The beveled face 48L is formed at the pitch direction inside of the anchor indentation 48.

Moreover, the anchor portion 48K is formed to the anchor indentation 48 to anchor the engagement portion 35K of the projection claw 35. The anchor portion 48K is formed below the beveled face 48L.

When assembling the fitting housing 30 to the mounted housing 40, the engagement portion 35K of the projection claw 35 runs across the beveled face 48L of the anchor indentation 48, such that the pair of the projection claws 35 are elastically deformed toward the pitch direction outside thereby.

When the engagement portion 35K of the projection claw 35 has run across over the beveled face 48L, the elastically deformed projection claw 35 returns to its original shape. This means that the engagement portion 35K of the projection claws 35 is disposed below the anchor portion 48K formed at a lower side of the beveled face 48L of the anchor indentation 48 (see FIG. 16). Thus from this state, were the fitting housing 30 to be moved upward with respect to the mounted housing 40, the engagement portions 35K of the projection claws 35 would abut the anchor portion 48K of the anchor indentation 48, preventing both the housings 30, 40 from separating from each other.

Signal Terminal Retaining Portion Cross-Section Structure

Next, explanation follows regarding cross-section structures of the signal terminal retaining holes 41 of the mounted housing 40, and the signal terminal retaining holes 37 and the signal terminal retaining grooves 36 of the fitting housing 30.

Note that in FIG. 19 to FIG. 24, the pair of the signal terminals 10 furthest to the inter-row direction one side is omitted from illustration in order to more easily see the structure of the signal terminal retaining portions 36, 37, 41.

Explanation first follows regarding a cross-section structure of the signal terminal retaining holes 41 of the mounted housing 40.

Figure 19:
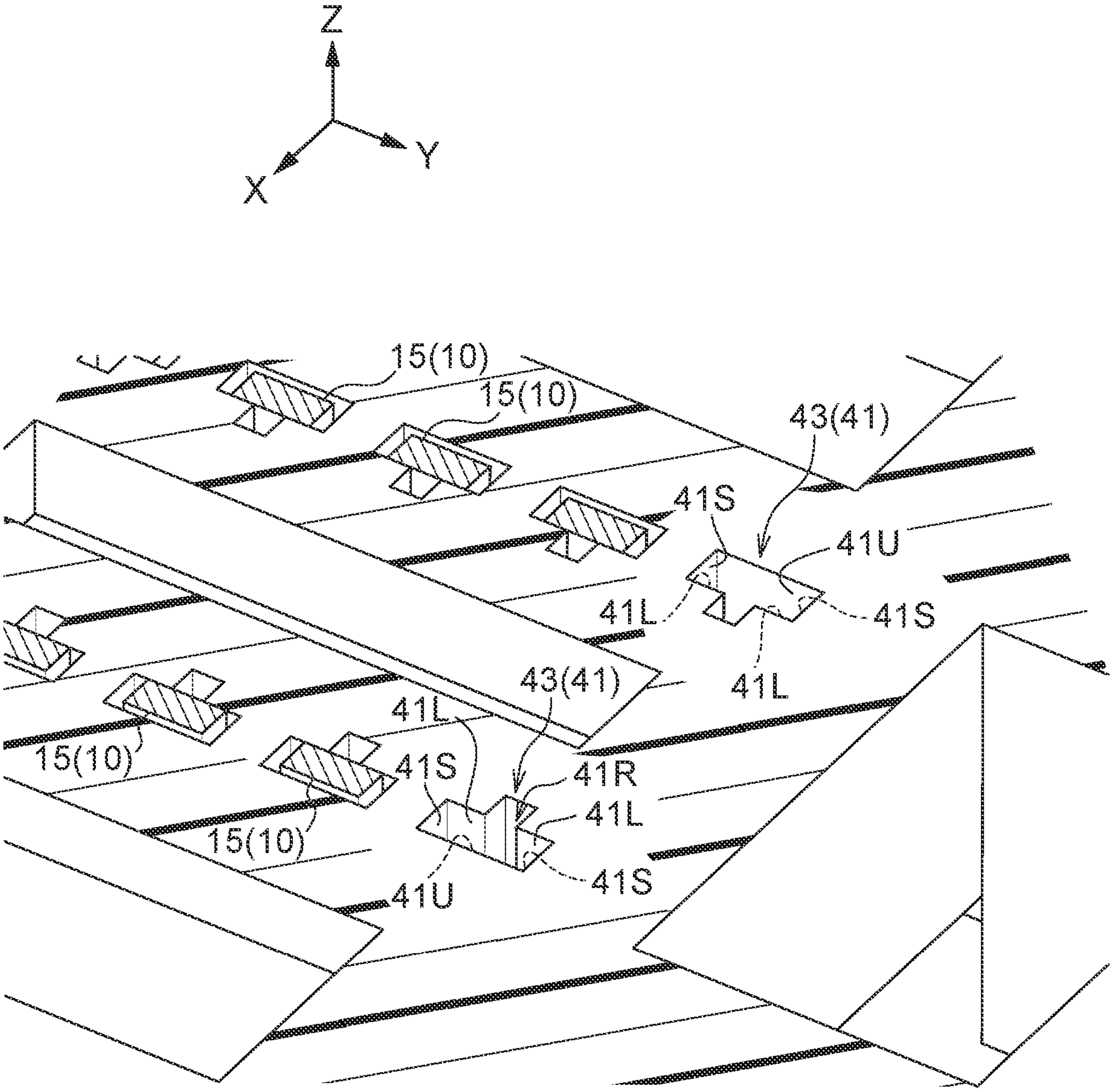
FIG. 19 is a cross-section illustrating a lower portion of signal terminal retaining holes of a mounted housing (a cross-section along line 19-19 in FIG. 14).
Figure 20:
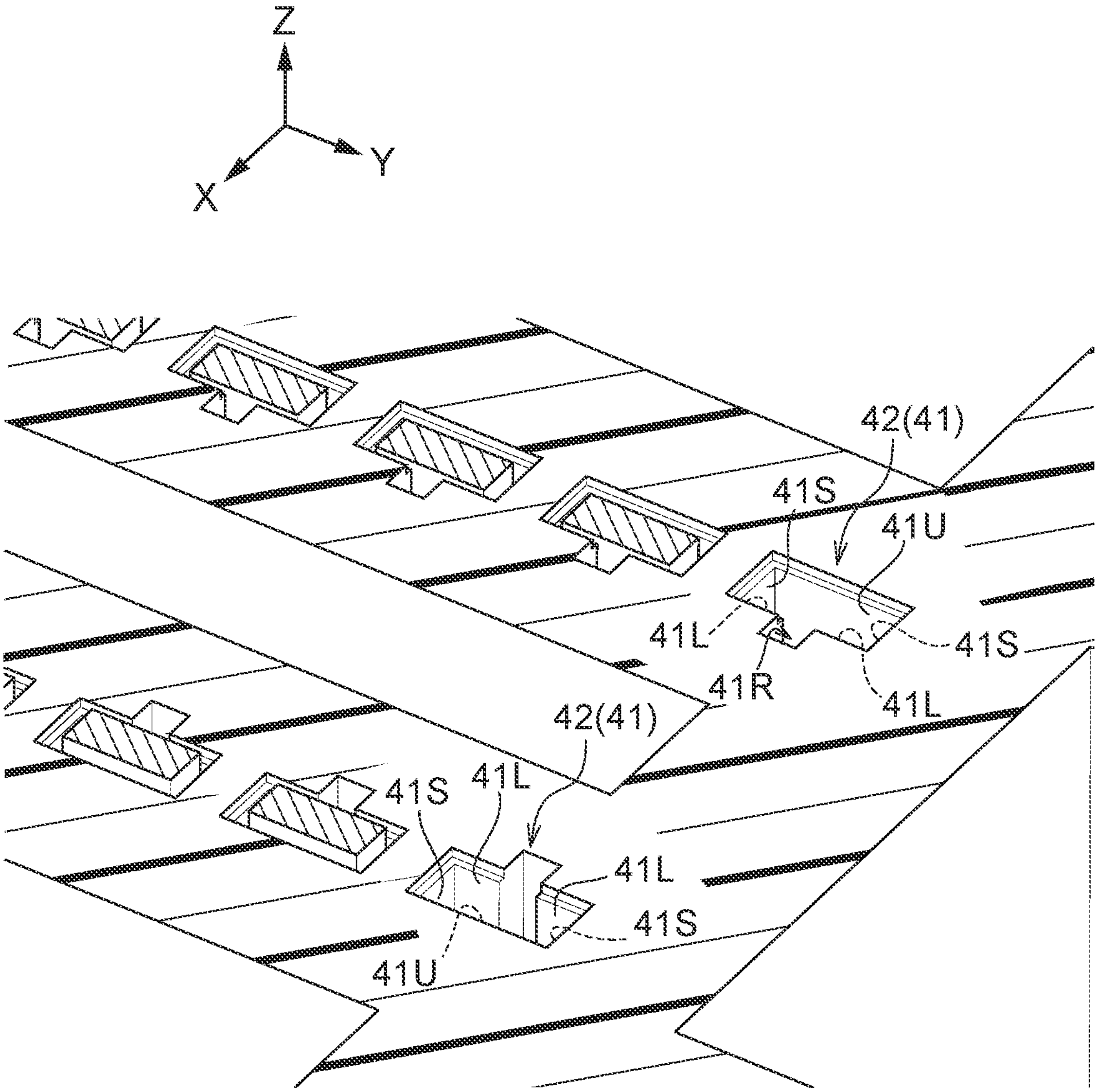
FIG. 20 is a cross-section illustrating a boundary between a lower portion and an upper portion of signal terminal retaining holes of a mounted housing (a cross-section along line 20-20 in FIG. 14).
Figure 21:
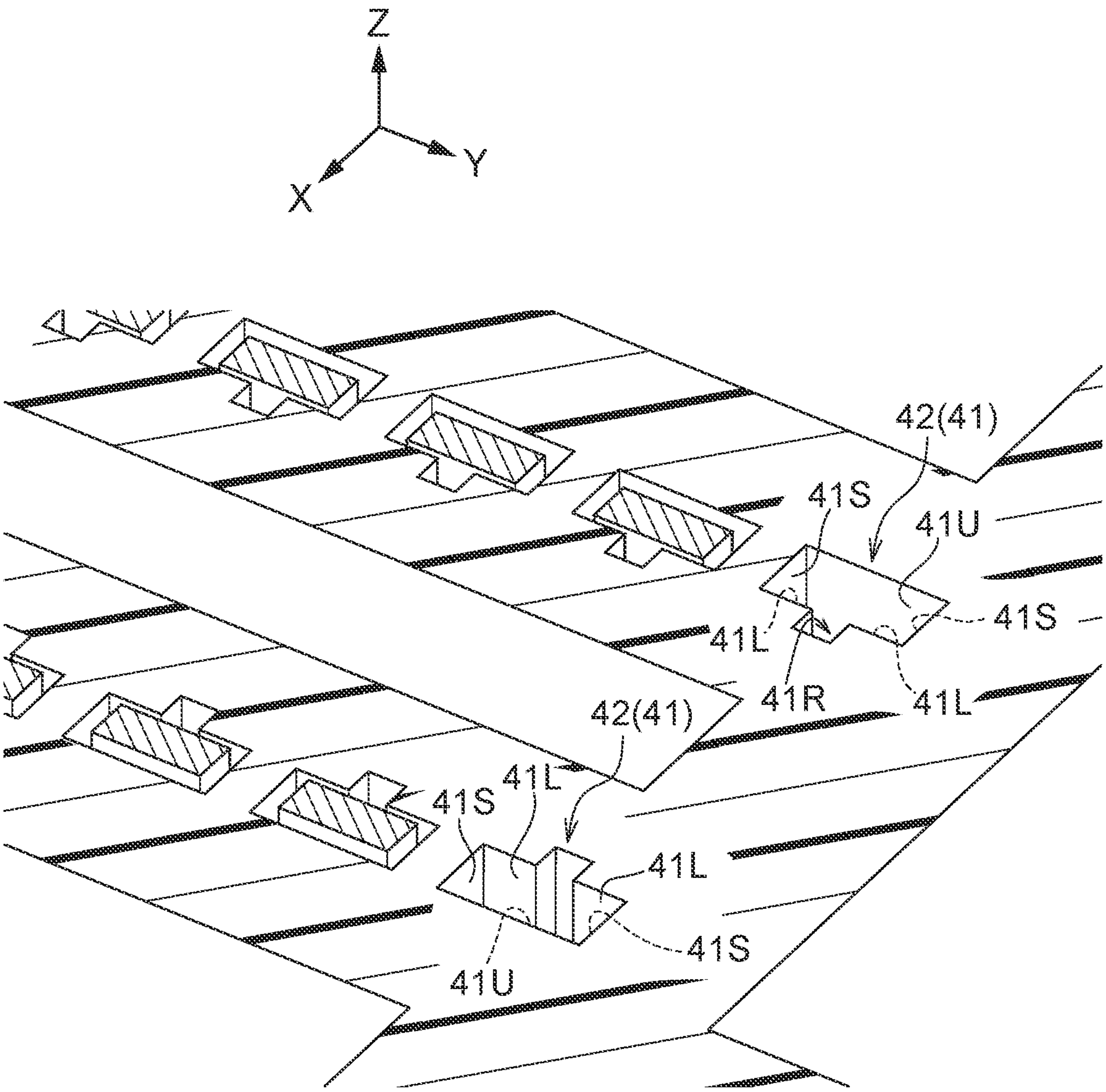
FIG. 21 is a cross-section illustrating an upper portion of signal terminal retaining holes of a mounted housing (a cross-section along line 21-21 in FIG. 14).

FIG. 19, FIG. 20, and FIG. 21 are diagrams illustrating enlargements of the signal terminal retaining holes 41 of the mounted housing 40, and are cross-section perspective views illustrating in states sectioned along planes orthogonal to the up-down direction (see FIG. 14).

FIG. 19 illustrates lower portions 43 of the signal terminal retaining holes 41 of the mounted housing 40. FIG. 20 illustrates boundary portions between the lower portions 43 and the upper portions 42 of the signal terminal retaining holes 41 of the mounted housing 40. FIG. 21 illustrates the upper portions 42 of the signal terminal retaining holes 41 of the mounted housing 40.

The signal terminal retaining holes 41 of the mounted housing 40 can be divided into the lower portions 43 and the upper portions 42 by their different cross-section structures. The upper portions 42 of the signal terminal retaining holes 41 of the mounted housing 40 have larger holes than the lower portions 43. As illustrated in FIG. 20, steps are formed at boundaries between the lower portions 43 and the upper portions 42 of the signal terminal retaining holes 41 in the mounted housing 40.

As illustrated in FIG. 19, FIG. 20, and FIG. 21, the signal terminal retaining holes 41 of the mounted housing 40 include, for both the upper portions 42 and the lower portions 43, an inter-row direction inside face 41L, a pair of side faces 41S, and an inter-row direction outside face 41U.

The inter-row direction inside face 41L of the upper portions 42 of the signal terminal retaining holes 41 are positioned more to the inter-row direction inside than the inter-row direction inside face 41L of the lower portions 43.

The side faces 41S on the pitch direction one side of the upper portions 42 of the signal terminal retaining holes 41 are positioned further to the pitch direction one side than the side faces 41S on the pitch direction one side of the lower portions 43.

The side faces 41S on the pitch direction other side of the upper portions 42 of the signal terminal retaining holes 41 are positioned further to the pitch direction other side than the side faces 41S on the pitch direction other side of the lower portions 43.

The inter-row direction outside face 41U of the upper portions 42 of the signal terminal retaining holes 41 are positioned further to the inter-row direction outside than the inter-row direction outside face 41U of the lower portions 43.

The mounted side retained portions 15 of the signal terminals 10 are disposed at positions toward the inter-row direction inside of the signal terminal retaining holes 41. Such a configuration is realized by formation of the bead 152 to the mounted side retained portion 15.

Thus in the lower portions 43 of the signal terminal retaining holes 41, the signal terminals 10 contact the inter-row direction inside faces 41L of the signal terminal retaining holes 41 (see FIG. 19). However, in the upper portions 42 of the signal terminal retaining holes 41, there is a gap open between the inter-row direction inside faces 41L of the signal terminal retaining holes 41 and the signal terminals 10 (see FIG. 21).

An indentation 41R indented toward the inter-row direction inside is formed at the inter-row direction inside of each of the signal terminal retaining holes 41. The position where the indentation 41R is formed is a width direction (pitch direction) intermediate position on the inter-row direction inside face 41L. Thus the inter-row direction inside face 41L is separated by the indentation 41R into a width direction (pitch direction) one side and other side. The one side inter-row direction inside face 41L and the other side inter-row direction inside face 41L separated by the indentation 41R are both abutting or in close proximity to the signal terminal 10 from the inter-row direction inside.

In cross-section viewed orthogonally to the up-down direction (the terminal extension direction), the indentation 41R functions as an enlargement portion to widen a separation between the signal terminals 10 and the mounted housing 40. This enables the impedance of the signal terminals 10 to be adjusted by adjusting the shape of the enlargement portion (the indentation 41R).

The indentation 41R is formed in the shape of a groove extending in the up-down direction (the extension direction of the signal terminal retaining holes 41). The range over which the groove shaped indentation 41R is formed is the entire extension direction range of the signal terminal retaining holes 41 of the mounted housing 40. The cross-section profile of the indentation 41R is a rectangular shape.

Fitting Housing 30 Signal Terminal Retaining Portions 36, 37

Next explanation follows regarding cross-section structures of the signal terminal retaining holes 37 and the signal terminal retaining grooves 36 of the fitting housing 30.

Figure 22:
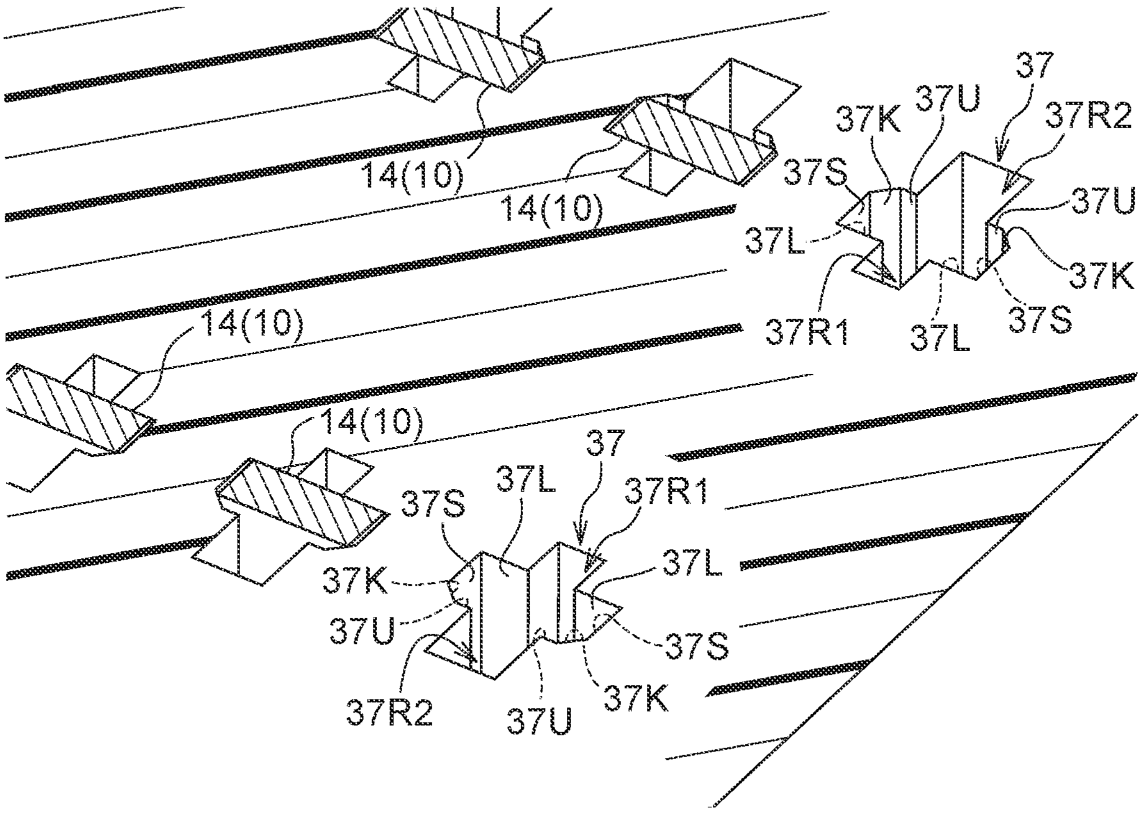
FIG. 22 is a cross-section illustrating signal terminal retaining holes of a fitting housing (a cross-section along line 22-22 in FIG. 14).
Figure 23:
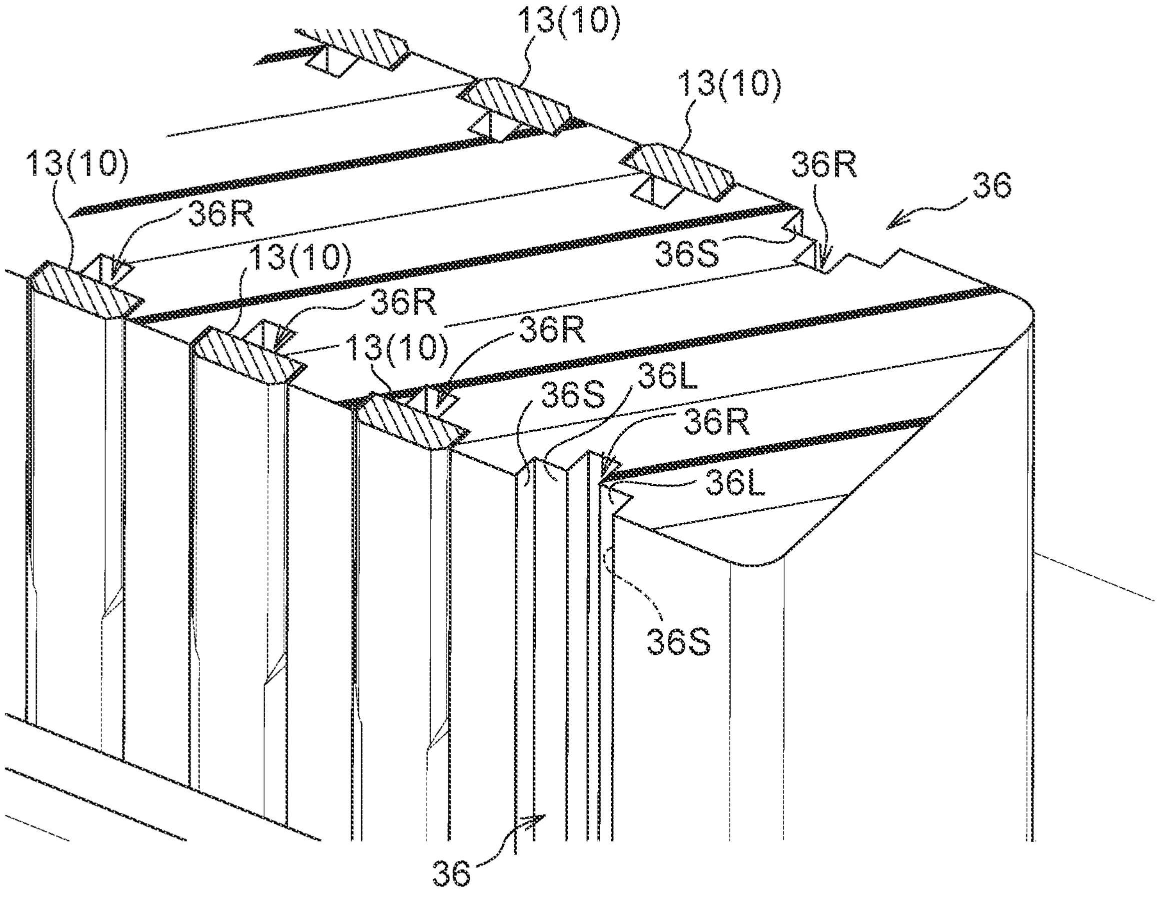
FIG. 23 is a cross-section illustrating signal terminal retaining grooves of a fitting housing (a cross-section along line 23-23 in FIG. 14).
Figure 24:
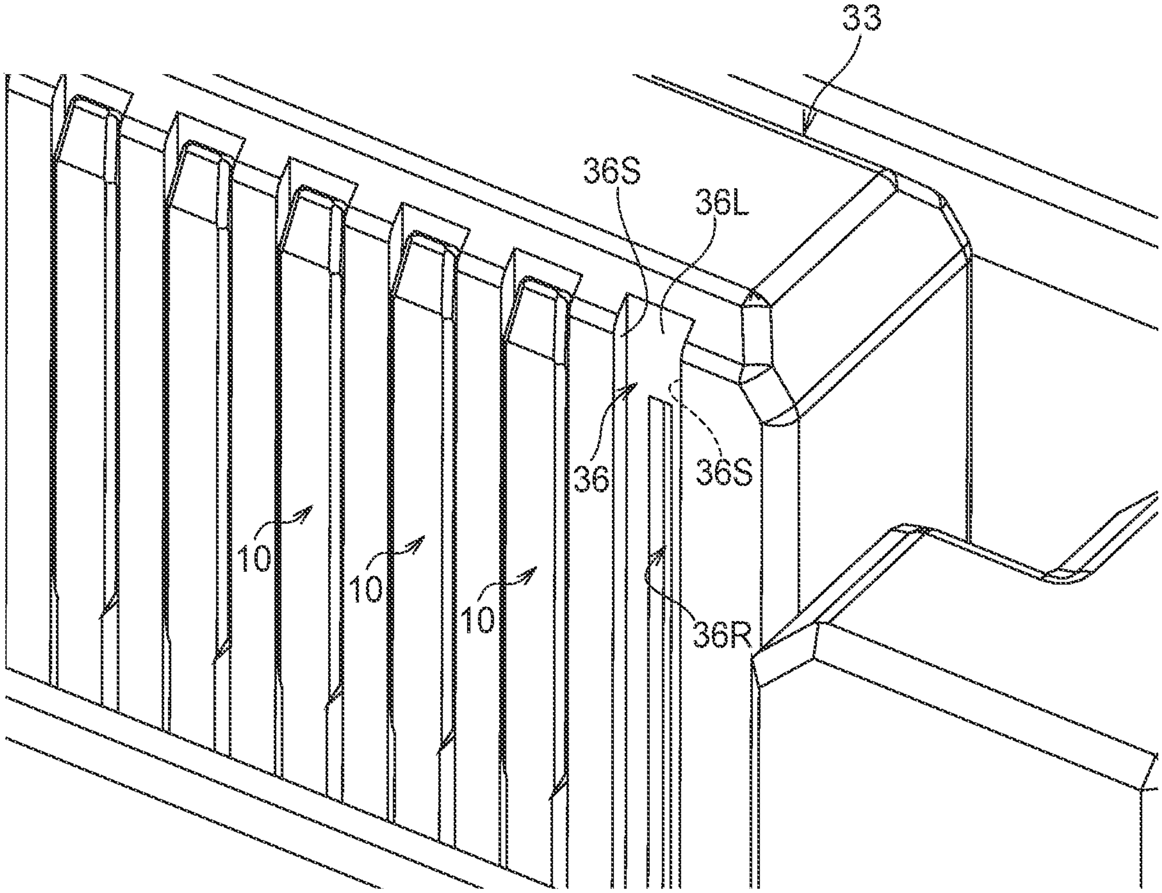
FIG. 24 is a perspective view illustrating signal terminal retaining grooves of a fitting housing.

FIG. 22, FIG. 23, and FIG. 24 are diagrams illustrating enlargements of the signal terminal retaining holes 37 or the signal terminal retaining grooves 36 of the fitting housing 30. FIG. 22 and FIG. 23 are cross-section perspective views illustrating states sectioned along planes orthogonal to the up-down direction (see FIG. 14), and FIG. 24 is a perspective view.

FIG. 22 illustrates the signal terminal retaining holes 37 (first side surrounding portion), and FIG. 23 and FIG. 24 illustrate the signal terminal retaining grooves 36.

As illustrated in FIG. 22, the signal terminal retaining holes 37 each include an inter-row direction inside face 37L, a pair of side faces 37S, and an inter-row direction outside face 37U. The inter-row direction inside face 37L abuts or is in close proximity to the inter-row direction inside of the signal terminal 10, the pair of side faces 37S are in close proximity to the pitch direction outside of the signal terminal 10, and the inter-row direction outside face 37U is in close proximity to the inter-row direction outside of the signal terminal 10.

A pair of beveled faces 37K is formed between the inter-row direction outside face 37U and the pair of side faces 37S. The pair of beveled faces 37K contacts the retained portion 14 of the signal terminals 10. Specifically, corner portions of the retained portion 14 of each of the signal terminals 10 dig into the pair of beveled faces 37K. The retained portion 14 of the signal terminals 10 is disposed at the inside of the signal terminal retaining hole 37 further toward the inter-row direction inside than the beveled faces 37K.

The face of the signal terminal retaining hole 37 on the side toward which the signal terminal 10 is shifted and disposed is called the "bottom face", and the face of the signal terminal retaining hole 37 on the opposite side to the bottom face is called the "top face". The inter-row direction inside face 37L corresponds to the "bottom face" and the inter-row direction outside face 37U corresponds to the "top face".

A bottom face side indentation 37R1 is formed at the bottom face side (the inter-row direction inside face 37L side) of each of the signal terminal retaining holes 37. The position where the bottom face side indentation 37R1 is formed is a central position in the pitch direction (width direction) of the inter-row direction inside face 37L. Thereby the inter-row direction inside face 37L is separated by the bottom face side indentation 37R1 into a pitch direction (width direction) one side and other side. The one side inter-row direction inside face 37L and the other side inter-row direction inside face 37L separated by the bottom face side indentation 37R1 are both abutting or in close proximity to the signal terminal 10 from the bottom face side.

A top face side indentation 37R2 is formed at the top face side (the inter-row direction outside face 37U side) of the signal terminal retaining hole 37. The position where the top face side indentation 37R2 is formed is a central position of the inter-row direction outside face 37U (top face) in the pitch direction (width direction). Thereby the inter-row direction outside face 37U is separated by the top face side indentation 37R2 into the pitch direction (width direction) one side and other side. The one side inter-row direction outside face 37U and the other side inter-row direction outside face 37U separated by the top face side indentation are both abutting or in close proximity to the signal terminal 10 from the top face side.

The bottom face side indentation 37R1 and the top face side indentation 37R2 function as an enlargement portion widening separation between the signal terminal 10 and the fitting housing 30 when viewed in cross-section orthogonal to the up-down direction (terminal extension direction). This enables impedance of the signal terminal 10 to be adjusted by adjusting the shape of the enlargement portions (the bottom face side indentation 37R1 and the top face side indentation 37R2).

The cross-section profile of the bottom face side indentation 37R1 is rectangular shaped. The cross-section profile of the top face side indentation 37R2 is rectangular shaped. The pitch direction dimension (width of indentation) of the top face side indentation 37R2 is larger than the pitch direction dimension (width of indentation) of the bottom face side indentation 37R1. The inter-row direction dimension (depth of indentation) of the top face side indentation 37R2 is larger than the inter-row direction dimension (depth of indentation) of the top face side indentation 37R2.

The bottom face side indentation 37R1 and the top face side indentation 37R2 are formed in a groove shape extending in the up-down direction. The range over which the groove shaped bottom face side indentation 37R1 and top face side indentation 37R2 are formed is the entire range in the extension direction of the signal terminal retaining hole 37 of the fitting housing 30.

Retaining Grooves

Next, explanation follows regarding the signal terminal retaining grooves 36 configuring an upper portion of the signal terminal retaining grooves 36, 37 of the fitting housing 30.

The signal terminal retaining grooves 36 of FIG. 23 and FIG. 24 are formed to the pair of wall faces 33A, 33B of the projecting wall 33 of the fitting housing 30. The signal terminal retaining grooves 36 are formed with a groove depth direction as the inter-row direction inside, with a groove extension direction as the up-down direction, and with a groove width direction as the pitch direction.

Each of the signal terminal retaining grooves 36 is configured including an inter-row direction inside face 36L contacting or in close proximity to the inter-row direction inside of the signal terminal 10, and a pair of side faces 36S contacting or in close proximity to the two pitch direction sides of the signal terminal 10. By arranging the signal terminal 10 in the signal terminal retaining groove 36, the fitting housing 30 contacts or is in close proximity with the signal terminal 10 from three directions, the inter-row direction inside and the two pitch direction sides.

An indentation 36R is formed to the bottom face side (the inter-row direction inside face 36L side) of each of the signal terminal retaining grooves 36. A space to the signal terminal 10 at the bottom face side is enlarged by the indentation 36R. The impedance of the portion of the signal terminal housed in the signal terminal retaining groove 36 can be adjusted by adjusting the shape and size of the indentation 36R.

The position where the indentation 36R is formed is a central position of the inter-row direction inside face 36L in the pitch direction (width direction). The inter-row direction inside face 36L is thereby separated by the indentation 36R into the pitch direction (width direction) one side and other side. The one side inter-row direction inside face 36L and the other side inter-row direction inside face 36L separated by the bottom face side indentation are both abutting or in close proximity to the signal terminal 10 from the bottom face side.

The indentation 36R is formed in a groove shape extending along the up-down direction (the extension direction of the signal terminal retaining groove 36). The cross-section profile of the indentation 36R (cross-section profile orthogonal to the extension direction) is a rectangular shape.

The indentation 36R of the signal terminal retaining groove 36 is above/below connected to the bottom face side indentation 37R1 of the signal terminal retaining hole 37. More specifically, the indentation 36R of the signal terminal retaining groove 36 and the bottom face side indentation 37R1 of the signal terminal retaining hole 37 are contiguous in the up-down direction while both having the same cross-section profile.

As illustrated in FIG. 24, the upper end (leading end) of the indentation 36R of the signal terminal retaining groove 36 does not reach as far as the upper end (leading end) of the signal terminal retaining groove 36. The indentation 36R of the signal terminal retaining groove 36 is thereby covered by the signal terminal 10, such that the indentation 36R is not exposed. Were the indentation 41R to be exposed further to the upper side (leading end side) than the upper end (leading end) of the signal terminal 10, then a problem might occur of a counterpart side connector or the like, serving as a connection target, catching on the indentation 41R, and foreign matter entering the indentation 41R. In contrast thereto, the leading end side portion of the indentation 41R is covered by the terminal, and so such a problem is prevented.

Moreover, the upper end (leading end) of the indentation 41R does not reach as far as the position covered by the leading end portion 19 of the signal terminal 10, and is covered by the wide portion 16 of the signal terminal 10. Foreign matter is thereby more certainly prevented from entering the indentation 41R and the like.

Operation and Advantageous Effects

Explanation follows regarding operation and advantageous effects of the present exemplary embodiment.

In the present exemplary embodiment the connector 100 includes the terminals (the signal terminal 10, the power source terminals 20), and the housings 30, 40 into which the terminals are inserted. The housings 30, 40 are configured including the first housing (the fitting housing 30) and the second housing (the mounted housing 40). The first housing includes the first side retaining portions (the signal terminal retaining portions 36, 37 and the power source terminal retaining portions 38, 39 of the fitting housing 30) for retaining part of the terminals, and the second housing includes the second side retaining portions (the signal terminal retaining portions 41 and the power source terminal retaining portions 44 of the mounted housing 40) for retaining another part of the terminals.

Namely, the retaining portions for retaining the terminals are formed so as to be divided between the first housing (the fitting housing 30) and the second housing (the mounted housing 40). Namely, the moldability of housing molding using a mold is increased and the degrees of freedom of design are raised for the retaining portions compared to a configuration in which all of the retaining portions for retaining the terminals are formed to a single housing. Raising the degrees of freedom of design for the retaining portions facilitates adjustment of connector characteristics, such as impedance and the like.

Moreover, in the present exemplary embodiment the first side retaining portions (the signal terminal retaining portions 36, 37 of the fitting housing 30) are configured including the first side surrounding portions (the signal terminal retaining holes 37 of the fitting housing 30) that surround the terminals (the signal terminals 10), and the second side retaining portions (the signal terminal retaining holes 41 of the mounted housing 40) are configured including the second side surrounding portions (the signal terminal retaining holes 41 of the mounted housing 40) that surround the terminals (the signal terminal 10). Namely, the first side retaining portions and the second side retaining portions are configured including the surrounding portions that surround the terminals.

This, for example, accordingly enables the impedance of the portion of the terminal retained in the second housing (the mounted housing 40) so be suppressed from rising in comparison to a configuration in which the first side retaining portion includes a surrounding portion but the second side retaining portion does not include a surrounding portion.

Moreover, in the present exemplary embodiment the first side retaining portions (the signal terminal retaining portions 36, 37 of the fitting housing 30) and the second side retaining portions (the signal terminal retaining portions 41 of the mounted housing 40) are positioned on a straight line.

This means that there is no need to form a bent portion between the portion of the terminal (the signal terminal 10) retained by the first side retaining portion and the portion thereof retained by the second side retaining portion.

Moreover, in the present exemplary embodiment the first side surrounding portion (the signal terminal retaining hole 37 of the fitting housing 30) and the second side surrounding portion (the signal terminal retaining holes 41 of the mounted housing 40) are also positioned on a straight line.

This means that in manufacturing the connector, when the first housing (the fitting housing 30) and the second housing (the mounted housing 40) are positioned with respect to each other (see FIG. 14), the first side surrounding portion (the signal terminal retaining holes 37 of the fitting housing 30) and the second side surrounding portion (the signal terminal retaining holes 41 of the mounted housing 40) are positioned on straight lines. This enables the terminals (the signal terminals 10) to be inserted along these straight lines.

Moreover, in the present exemplary embodiment a distance D between the first side surrounding portion (the signal terminal retaining hole 37 of the fitting housing 30) and the second side surrounding portion (the signal terminal retaining holes 41 of the mounted housing 40) (see FIG. 7) is short (specifically, is shorter than the shorter from out of the first side surrounding portion (the signal terminal retaining holes 37 of the fitting housing 30) and the second side surrounding portion (the signal terminal retaining holes 41 of the mounted housing 40).

The length of portion of the terminals (the signal terminals 10) positioned between the first side surrounding portion and the second side surrounding portion, namely a length of a portion not surrounded by the housings 30, 40, is accordingly short. As a result this enables a segment susceptible to a rise in impedance to be made shorter in comparison to configurations in which this length is long.

Moreover, in the present exemplary embodiment, the first housing is the fitting housing 30 for fitting together with the connection target, and the second housing is the mounted housing 40 disposed between the first housing and the substrate. The terminals (the signal terminals 10, the power source terminals 20) are inserted into the housings 30, 40 using the uncoupling direction as the insertion direction.

This is accordingly suitable for a connector long in the fitting direction.

Moreover, there are plural of the terminals (the signal terminals 10) provided in the present exemplary embodiment. The plural terminals include plural one side terminals (the one side signal terminals 10A) arrayed in the pitch direction at the inter-row direction one side, and plural other side terminals (the other side signal terminals 10B) arrayed in the pitch direction at the inter-row direction other side. The first housing (the fitting housing 30) includes the projecting wall 33 projecting out in the uncoupling direction and extending in the pitch direction, and plural grooves (the signal terminal retaining grooves 36) that retain the plural one side terminals are formed to the wall faces 33A on the inter-row direction one side of the projecting wall 33, and plural grooves (the signal terminal retaining grooves 36) that retain the plural other side terminals are formed to the wall face 33B of the inter-row direction other side of the projecting wall 33.

This is accordingly suitable for a multipolar plug connector.

Moreover, in the present exemplary embodiment the first housing is the fitting housing 30 for fitting together with a connection target. The terminals (the signal terminals 10) are inserted into the housings 30, 40 using the uncoupling direction from the second housing side out of the first housing or the second housing (the mounted housing 40) as the insertion direction.

The end on the fitting direction side (lower side) of the second side surrounding portion (the signal terminal retaining hole 41 of the mounted housing 40) is positioned over a range encompassing 20% of a fitting direction side of the connector (and more preferably in a range of 15% thereof) (see FIG. 14).

This enables the portion on the fitting direction side of the terminals (the signal terminals 10) to be effectively surrounded by the second surrounding portion. This accordingly enables impedance at a portion on the fitting direction side of the terminals (the signal terminals 10) to be suppressed from rising compared to the connector of Patent Document 1 in which the portion (lower portion) on the fitting direction side of the terminal is exposed.

Moreover, in the present exemplary embodiment the first housing (the fitting housing 30) is the fitting housing 30 for fitting together with the connection target (counterpart side connector). The terminals (the signal terminals 10) are inserted into the housings 30, 40 using the uncoupling direction from the second housing side out of the first housing or the second housing (the mounted housing 40) as the insertion direction. The second side retaining portion (the signal terminal retaining portion 41 of the mounted housing 40) is configured merely by the second side surrounding portion (the signal terminal retaining hole 41 of the mounted housing 40) that surrounds the terminals (the signal terminals 10).

This enables the portion on the fitting direction side of the terminal to be effectively surrounded by the mounted housing 40. This, for example, enables the impedance of the portion on the fitting direction side of the terminal to be suppressed from rising compared to the connector of Patent Document 1 in which the portion (lower portion) on the fitting direction side of the terminal is exposed.

Moreover, in the present exemplary embodiment the terminals (the signal terminals 10) include the first side press-fit portion (the fixing side press-fit portion 141) press-fitting into the first housing (the fitting housing 30), and the second side press-fit portion (the mounted side press-fit portions 151) press-fitting into the second housing (the mounted housing 40).

Thus separation of the first housing from the second housing is suppressed by the terminals.

Moreover, in the present exemplary embodiment the signal terminals 10 and the power source terminals 20 are inserted into the housings 30, 40 from the second housing side, out of the first housing (the fitting housing 30) or the second housing (the mounted housing 40). The signal terminals 10 each include the first side press-fit portion (the fixing side press-fit portion 141) press-fitting into the first housing, and the second side press-fit portions (the mounted side press-fit portions 151) press-fitting into the second housing. The power source terminals 20 each include a second side press-fit portion (the wide portion 24) press-fitting into the second housing, and do not include a first side press-fit portion press-fitting into the first housing.

Separation of the first housing from the second housing is accordingly suppressed by the signal terminals 10. Moreover, the power source terminals 20 do not include a first side press-fit portion press-fitting into the first housing (the fitting housing 30), and so insertion of the power source terminals 20 into the housings 30, 40 is facilitated in a state in which the first housing and the second housing have been positioned.

Moreover, the number of the signal terminals 10 is greater than the number of the power source terminals 20, and so suppression of separation of the first housing from the second housing is performed by the more numerous signal terminals 10.

Namely, in the present exemplary embodiment insertion of the terminals (the signal terminals 10 and the power source terminals 20) into the housing is easier than in a configuration in which both the signal terminals 10 and the power source terminals 20 include the first side press-fit portion, and suppression of separation of the first housing from the second housing is able to be performed with more certainty than a configuration in which only the less numerous power source terminals 20 include the first side press-fit portion.

Furthermore, in the present exemplary embodiment, the power source terminals 20 are formed from a material of greater plate thickness (specifically a material having a greater plate thickness than the signal terminal 10). This means that the orientation of the power source terminals 20 is not liable to be disrupted even though the power source terminals 20 do not include a first side press-fit portion (portion press-fitting into the first housing).

Moreover, in the present exemplary embodiment the first housing (the fitting housing 30) and the second housing (the mounted housing 40) are equipped with the separation prevention mechanisms 35, 48. The separation prevention mechanisms 35, 48 are configured including the engagement claws (the projection claws 35) and the anchor portions 48K, with assembly direction separation of the first housing from the second housing prevented by the engagement claws hooking onto the anchor portions 48K.

The assembly direction separation of the first housing from the second housing is accordingly prevented by the first housing and second housing themselves.

Moreover, in the present exemplary embodiment, the separation prevention mechanisms 35, 48 include the one side separation prevention mechanisms 35, 48 formed between the plural signal terminals 10 and the single or plural one side power source terminals 20A, and the other side separation prevention mechanisms 35, 48 formed between the plural signal terminals 10 and the single or plural other side power source terminals 20B.

This enables the connector 100 to be made compact in the connector short side direction.

Moreover, in the present exemplary embodiment the first housing (the fitting housing 30) and the second housing (the mounted housing 40) are equipped with the displacement restricting mechanisms (the XY direction displacement restricting mechanisms 34, 47). The displacement restricting mechanisms are configured including the positioning protrusions 34 and the positioning indentations 47, and restrict mutual displacement in directions orthogonal to the assembly direction of the first housing and the second housing by the positioning protrusions 34 being inserted into the positioning indentations 47.

Thus the mutual displacement in the directions orthogonal to the assembly direction of the first housing and the second housing is prevented by the first housing and the second housing themselves.

Moreover, in the present exemplary embodiment the plural grooves (the signal terminal retaining grooves 36) that retain the plural terminals (the signal terminals 10) are formed to the wall faces 33A, 33B at both inter-row direction sides of the projecting wall 33. In such a connector there is a space (the fitting indentation 30U) formed at the inter-row direction outside of the projecting wall 33 in which a portion of a connection target such as the counterpart side connector is disposed.

A portion further to the fitting direction side than this space (the fitting indentation 30U) is utilized to form the displacement restricting mechanism (XY direction displacement restricting mechanisms 34, 47). This accordingly enables a connector to be made compact while still being equipped with the displacement restricting mechanism.

Moreover, in the present exemplary embodiment, as illustrated in FIG. 16, the distance in the pitch direction between a pair of pitch direction outside faces 301 of the fitting housing 30 (the pitch direction dimension of the fitting housing 30) and the distance in the pitch direction between pitch direction outside faces 401 of the mounted housing 40 (the pitch direction dimension of the mounted housing 40) are the same as each other. Furthermore, as illustrated in FIG. 14, the distance in the inter-row direction between a pair of inter-row direction outside faces 302 of the fitting housing 30 (the inter-row direction dimension of the fitting housing 30) and the distance in the inter-row direction between the inter-row direction outside faces 402 of the mounted housing 40 (the inter-row direction dimension of the mounted housing 40) are the same as each other.

Thus disposing the fitting housing 30 and the mounted housing 40 inside a frame shaped jig (not illustrated in the drawings) surrounding the fitting housing 30 and the mounted housing 40 from the XY directions enables positioning of the fitting housing 30 and the mounted housing 40 to be performed easily in the XY directions, and enables the terminals 10, 20 to be inserted in this state.

Supplementary Explanation to Above Exemplary Embodiment

Note that although in the present exemplary embodiment the first side retaining portion and the second side retaining portion both include a surrounding portion, a configuration may be adopted in which one, or both, of the first side retaining portion or the second side retaining portion does not include a surrounding portion. Even in such cases, by dividing forming of the retaining portions that retain the terminals across the first housing and the second housing, the degrees of freedom of design for the retaining portions is raised, and adjustment is easily made to the connector characteristics.

Moreover, although explanation was given in the exemplary embodiment described above of a case in which the retaining grooves and the retaining holes are abutting or in close proximity from three directions or four dictions including a two mutually opposing directions with respect to a portion of the terminals (the two plate width direction sides of the terminals), the "retaining portion" is not limited thereto. A configuration may be adopted in which a portion abutting or being in close proximity from two mutually opposing directions with respect to a portion of the terminal restricts movement of the portion of the terminal in the two directions.

Moreover, the first housing and the second housing may be joined by welding or by another means.

Moreover, although in the exemplary embodiment described above the first housing and the second housing contact each other, the first housing and the second housing may have a relationship in which they are arranged so as not to contact each other.

Moreover, although in the exemplary embodiment described above a direction perpendicular to the substrate on which the connector is mounted is the fitting direction for fitting together with the counterpart side connector, a connector may be configured with a fitting direction of a direction along the substrate on which the connector is mounted.

Moreover, although in the exemplary embodiment described above a protrusion of the displacement restricting mechanism is formed to the first housing, and an indentation thereof is formed to the second housing, a configuration may be adopted in which an indentation is formed to the first housing and a protrusion is formed to the second housing.

Moreover, although in the exemplary embodiment described above the engagement claw of the separation prevention mechanism is formed to the first housing and the anchor portion is formed to the second housing, a configuration may be adopted in which an anchor portion is formed to the first housing and an engagement claw is formed to the second housing.

Moreover, in the exemplary embodiment described above, the fitting housing 30 serving as the first housing and the mounted housing 40 serving as the second housing are members entirely formed of a resin, "first housing" and the "second housing" of the present disclosure are not limited thereto. For example, the first housing and the second housing may be members configured by joining resin together with metal. For example, although in the exemplary embodiment described above the projection claws 35 serving as the "engagement claw" are formed from a resin, the engagement claw may be formed from a metal.

Moreover, although in the exemplary embodiment described above, the power source terminals 20 do not include an anchor projection (first side press-fit portion) for press-fitting into the fitting housing 30 serving as the first housing, the "power source terminal" of the present disclosure is not limited to one not including a first side press-fit portion. For example, the power source terminal may include both a first side press-fit portion and a second side press-fit portion.

Moreover, although in the exemplary embodiment described above, the XY direction displacement restricting mechanisms 34, 47 serving as the "displacement restricting mechanism" are configured from the plural positioning indentations 47 and the plural positioning protrusions 34, the "displacement restricting mechanism" of the present disclosure may be configured from a single positioning indentation and a single positioning protrusion.

Moreover, although in the exemplary embodiment described above a space formed by the positioning indentations 47 has a substantially cuboidal shape and the positioning protrusions 34 have a substantially cuboidal shape, the "indentation" and the "protrusion" of the present disclosure are not limited thereto. For example, the protrusion may be formed with another shape, such as a cylindrical pillar shape.

Moreover, although in the exemplary embodiment described above the XY direction displacement restricting mechanisms 34, 47 serving as the displacement restricting mechanism are configured such that the fitting housing 30 is able to displace in a predetermined range in both the XY directions with respect to the mounted housing 40, the "displacement restricting mechanism" of the present disclosure is not limited thereto. The displacement restricting mechanism of the present disclosure may be configured such that a protrusion is press-fitted into an indentation.

Moreover, although in the exemplary embodiment described above explanation has been given of a method in which the fitting housing 30 and the mounted housing 40 are disposed inside the frame shaped jig (not illustrated in the drawings) surrounding the fitting housing 30 and the mounted housing 40 from the XY directions, and the terminals 10, 20 are inserted in a state in which the fitting housing 30 and the mounted housing 40 have been positioned in the XY directions, the method of manufacturing a connector of the present disclosure is not limited thereto.

Alternatively the frame shaped jig surrounding the fitting housing 30 and the mounted housing 40 from the XY directions may be formed slightly bigger, and the terminals 10, 20 inserted in a state in which the fitting housing 30 and the mounted housing 40 have been disposed inside this jig. Namely, a state may be adopted in which, by using the displacement restricting mechanism and the jig, the two housings are positioned somewhat in the XY directions (directions in a plane orthogonal to the terminal insertion direction), while some displacement in a predetermined range is still possible in both the XY directions, and the terminals then inserted while in this state. In this method too, the two housings can be mutual displaced so as to relieve stress at the stage in which the terminals are being inserted even in cases in which positional misalignment has occurred in the XY directions with respect to the terminal retaining portions of the two housings as a result of manufacturing tolerances of the housings.

Moreover, although in the exemplary embodiment described above the terminals (the signal terminals 10) include the first side press-fit portion and the second side press-fit portion, and the separation of the first housing from the second housing is suppressed by the terminals, the terminals of the present disclosure are not limited thereto.

Moreover, the separation of the first housing from the second housing may be suppressed by a metal member other than the terminals. For example, the connector of the present disclosure may include a metal member that includes a solder fixing portion fixed to the substrate by soldering, with the metal member being equipped with the first side press-fit portion and the second side press-fit portion. Moreover, for example, the connector of the present disclosure may include a metal member lacking a solder fixing portion, with the metal member equipped with the first side press-fit portion and the second side press-fit portion. Moreover, these metal members may be members that function as a shield member suppressing propagation of electromagnetic waves.

EXPLANATION OF THE REFERENCE NUMERALS

100 connector
10, 20 terminal
10 signal terminal
20 power source terminal
30, 40 housing
30 fitting housing (first housing)
33 projecting wall
33A inter-row direction one side wall face
33B inter-row direction other side wall face
36, 37 signal terminal retaining portion (first side retaining portion)
36 signal terminal retaining groove (groove)
37 signal terminal retaining hole (first side surrounding portion)
38, 39 power source terminal retaining portion (first side retaining portion)
38 power source terminal retaining groove
39 power source terminal retaining hole (first side surrounding portion)
40 mounted housing (second housing)
41 signal terminal retaining hole (second side retaining portion, second side surrounding portion)
44 power source terminal retaining hole (second side retaining portion, second side surrounding portion)
34, 47 XY direction displacement restricting mechanism (displacement restricting mechanism)
34 positioning protrusion (protrusion)
47 positioning indentation (indentation)
35, 48 separation prevention mechanism
35 projection claw (engagement claw)
35K engagement portion
48 anchor indentation
48K anchor portion
91 substrate
D distance (distance between first side surrounding portion and second side surrounding portion)

The invention claimed is:

1. A connector comprising:
a terminal; and
a housing into which the terminal is inserted; wherein:
the housing includes a first housing and a second housing;
the first housing and the second housing are not housings provided so as to cause mutual displacement of each other;
the first housing includes a first side retaining portion that retains a portion of the terminal; and
the second housing includes a second side retaining portion that retains another portion of the terminal;
wherein the first housing and the second housing include a separation prevention mechanism having an engagement claw and an anchor portion, with the separation prevention mechanism preventing separation in an assembly direction of the first housing and the second housing by the engagement claw hooking onto the anchor portion;
a plurality of terminals are provided;
  the plurality of terminals include a plurality of signal terminals and a plurality of power source terminals;
  the plurality of power source terminals include:
    one or more one side power source terminals arranged with respect to the plurality of signal terminals at a pitch direction one side of the signal terminals, and
    one or more other side power source terminals arranged with respect to the plurality of signal terminals at a pitch direction other side; and
  the separation prevention mechanism includes:
    a one side separation prevention mechanism formed between the plurality of signal terminals and the one or more one side power source terminals, and
    an other side separation prevention mechanism formed between the plurality of signal terminals and the one or more other side power source terminals.

2. A connector comprising:
a terminal; and
a housing into which the terminal is inserted; wherein:
the housing includes a first housing and a second housing;
the first housing includes a first side retaining portion that retains a portion of the terminal;
the second housing includes a second side retaining portion that retains another portion of the terminal;
the terminal is inserted into the housing from a second housing side of the first housing or the second housing;
a plurality of terminals are provided;
the plurality of terminals include signal terminals and power source terminals;
a number of the signal terminals is greater than a number of the power source terminals;
the signal terminals each include a first side press-fit portion that is press-fit into the first housing and a second side press-fit portion that is press-fit into the second housing; and
the power source terminals each include a second side press-fit portion that is press-fit into the second housing and do not include a first side press-fit portion that is press-fit into the first housing.

3. A connector comprising:

a terminal; and a housing into which the terminal is inserted; wherein:

the housing includes a first housing and a second housing;

the first housing and the second housing are not housings provided so as to cause mutual displacement of each other;

the first housing includes a first side retaining portion that retains a portion of the terminal; and the second housing includes a second side retaining portion that retains another portion of the terminal;

wherein the first housing and the second housing include a displacement restricting mechanism configured by a protrusion and an indentation, with the displacement restricting mechanism being configured to restrict mutual displacement in a direction orthogonal to an assembly direction of the first housing and the second housing by the protrusion being inserted into the indentation;

a plurality of terminals are provided;

the plurality of terminals include:

a plurality of one side terminals arrayed along a pitch direction at an inter-row direction one side, and a plurality of other side terminals arrayed along the pitch direction at an inter-row direction other side;

the first housing includes a projecting wall projecting out in an uncoupling direction and extending along the pitch direction;

a plurality of grooves that retain the plurality of one side terminals are formed in a wall face at the inter-row direction one side of the projecting wall, and a plurality of grooves that retain the plurality of other side terminals formed in a wall face at the inter-row direction other side of the projecting wall;

the protrusion of the displacement restricting mechanism is formed at the first housing and the indentation of the displacement restricting mechanism is formed at the second housing;

a plurality of indentations are provided; and the plurality of indentations are configured from:

one or more one side indentations formed at the inter-row direction one side with respect to the second side retaining portion, and one or more other side indentations formed at the inter-row direction other side with respect to the second side retaining portion.

* * * * *